(12) United States Patent
Ioffe et al.

(10) Patent No.: US 11,909,125 B2
(45) Date of Patent: Feb. 20, 2024

(54) WIRELESS NETWORKS WITH ANTENNA ARRAY SCALING CAPABILITIES

(71) Applicant: Apple Inc., Cupertino, CA (US)

(72) Inventors: Anatoliy S. Ioffe, Redwood City, CA (US); Amit Freiman, Sunnyvale, CA (US); Jan M. Zaleski, Altenberg bei Linz (AT); Ozgur Inac, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 500 days.

(21) Appl. No.: 17/161,409

(22) Filed: Jan. 28, 2021

(65) Prior Publication Data

US 2021/0249768 A1 Aug. 12, 2021

Related U.S. Application Data

(60) Provisional application No. 62/975,612, filed on Feb. 12, 2020.

(51) Int. Cl.
*H04W 72/21* (2023.01)
*H01Q 3/26* (2006.01)
(Continued)

(52) U.S. Cl.
CPC ............ *H01Q 3/26* (2013.01); *H01Q 1/243* (2013.01); *H01Q 21/205* (2013.01);
(Continued)

(58) Field of Classification Search
CPC ..... H04W 72/21; H04L 1/1812; H01Q 1/243; H01Q 21/205; H01Q 21/28
See application file for complete search history.

(56) References Cited

U.S. PATENT DOCUMENTS

| 8,781,420 B2 | 7/2014 | Schlub et al. |
| 9,667,290 B2 | 5/2017 | Ouyang et al. |

(Continued)

FOREIGN PATENT DOCUMENTS

| CN | 102136859 A | 7/2011 |
| CN | 102160430 A | 8/2011 |

(Continued)

OTHER PUBLICATIONS

ETSI TS, 5G; NR; User Equipment (UE) radio transmission and reception; Part 2: Range 2 Standalone, ETSI TS 138 101-2 v15.5.0 Release 15, May 2019, Sophia Antipolis Cedex, France.

*Primary Examiner* — Hai V Nguyen
(74) *Attorney, Agent, or Firm* — Treyz Law Group, P.C.; Michael H. Lyons; Tianyi He

(57) ABSTRACT

An electronic device may be provided with wireless circuitry and control circuitry. The wireless circuitry may communicate with a wireless base station using a 5G New Radio (NR) communications protocol. The wireless circuitry may include a phased antenna array. The electronic device may perform antenna scaling operations in which the active antennas in the phased antenna array change over time to optimize wireless performance and power consumption. The electronic device may inform the base station when antenna scaling operations have occurred. This may allow the base station to compensate for power density discontinuities associated with the antenna scaling operations. If desired, the base station may break transmit and receive signal beam correspondence and the electronic device may use different antenna scaling settings for transmitting and receiving signals.

20 Claims, 12 Drawing Sheets

(51) Int. Cl.
*H01Q 21/28* (2006.01)
*H01Q 1/24* (2006.01)
*H04L 1/1812* (2023.01)
*H01Q 21/20* (2006.01)

(52) U.S. Cl.
CPC ........... *H01Q 21/28* (2013.01); *H04L 1/1812* (2013.01); *H04W 72/21* (2023.01)

(56) References Cited

U.S. PATENT DOCUMENTS

| | | | |
|---|---|---|---|
| 10,812,125 B1* | 10/2020 | Badic | H04W 72/542 |
| 11,152,991 B2* | 10/2021 | Ashrafi | H01Q 21/065 |
| 2013/0035103 A1 | 2/2013 | Mujtaba et al. | |
| 2015/0333810 A1 | 11/2015 | Autti et al. | |
| 2018/0132114 A1* | 5/2018 | Sun | H04B 7/088 |
| 2019/0159136 A1* | 5/2019 | MolavianJazi | H04W 52/362 |
| 2019/0372630 A1* | 12/2019 | Brunel | H04W 52/42 |
| 2020/0067548 A1* | 2/2020 | Raghavan | H04B 1/3833 |
| 2020/0067549 A1* | 2/2020 | Raghavan | H04B 17/391 |
| 2020/0067563 A1* | 2/2020 | Raghavan | H04B 1/662 |
| 2020/0067606 A1* | 2/2020 | Raghavan | H04B 15/00 |
| 2020/0280928 A1* | 9/2020 | MolavianJazi | H04W 52/242 |
| 2022/0225418 A1* | 7/2022 | Wang | H04W 52/48 |
| 2022/0256519 A1* | 8/2022 | Jeon | G01S 7/0233 |
| 2023/0020648 A1* | 1/2023 | Cha | G01S 5/0036 |
| 2023/0079502 A1* | 3/2023 | Cha | H04B 17/328 370/252 |
| 2023/0084239 A1* | 3/2023 | Cha | H04W 52/241 |
| 2023/0127256 A1* | 4/2023 | Cha | H04W 52/242 370/318 |
| 2023/0164702 A1* | 5/2023 | Lee | H04W 52/346 455/522 |
| 2023/0269696 A1* | 8/2023 | Lee | H04W 24/10 455/456.1 |

FOREIGN PATENT DOCUMENTS

| | | |
|---|---|---|
| CN | 104754716 A | 7/2015 |
| CN | 104919716 A | 9/2015 |
| CN | 107113041 A | 8/2017 |
| CN | 107438955 A | 12/2017 |
| EP | 2613405 A1 | 7/2013 |
| EP | 2633726 A1 | 9/2013 |

\* cited by examiner

WIRELESS NETWORKS WITH ANTENNA ARRAY SCALING CAPABILITIES

This application claims the benefit of provisional patent application No. 62/975,612, filed Feb. 12, 2020, which is hereby incorporated by reference herein in its entirety.

FIELD

This relates generally to wireless networks and, more particularly, to wireless networks having electronic devices with wireless communications circuitry.

BACKGROUND

Electronic devices often include wireless communications circuitry. For example, cellular telephones, computers, and other devices often contain antennas and wireless transceivers for supporting wireless communications. The electronic devices communicate with wireless base stations in a wireless network.

It may be desirable to support wireless communications for the wireless network in millimeter wave and centimeter wave communications bands. Millimeter wave communications, which are sometimes referred to as extremely high frequency (EHF) communications, and centimeter wave communications involve communications at frequencies of about 10-300 GHz. Operation at these frequencies can support high bandwidths but may raise significant challenges. For example, unexpected power density discontinuities associated with radio-frequency signals received at the wireless base stations can limit the throughput and overall performance of the wireless network.

SUMMARY

An electronic device may be provided with wireless circuitry and control circuitry. The wireless circuitry may communicate with a wireless base station using a 5G New Radio (NR) communications protocol. The wireless circuitry and the base station may convey radio-frequency signals using the Frequency Range 2 (FR2) frequency range of the 5G NR communications protocol, for example.

The wireless circuitry may include a phased antenna array. The electronic device may perform antenna scaling operations in which the active antennas in the phased antenna array change over time to optimize wireless performance and power consumption. The electronic device may inform the base station when antenna scaling operations have occurred. This may allow the base station to compensate for power density discontinuities associated with the antenna scaling operations. If desired, the base station may break transmit and receive signal beam correspondence and the electronic device may use different antenna scaling settings for transmitting and receiving signals.

In one suitable arrangement, a first set of antennas in the phased antenna array may transmit uplink signals to the wireless base station at a first output power level. The phased antenna array may receive a transmit power control (TPC) command from the wireless base station. A second set of antennas in the phased antenna array may transmit the uplink signals to the wireless base station at a second output power level based on the received TPC command. The second set of antennas may include a different number of antennas than the first set of antennas. The uplink signals transmitted by the second set of antennas may include an antenna scaling indication that identifies that the electronic device has changed active antennas in the phased antenna array for transmission of the uplink signals. The antenna scaling indication may be transmitted using a physical uplink shared channel (PUSCH), a physical uplink control channel (PUCCH), a sounding reference signal (SRS), a media access control layer control element (MAC CE), and/or radio resource control (RRC) message. The antenna scaling indication may include a single bit, two bits, or three or more bits appended to data in the uplink signals. In a possible arrangement, the network may configure the first set of antennas may transmit a power headroom until scaling (PHAS) report to the base station prior to reception of the TPC command.

In another suitable arrangement, the base station may transmit first downlink signals to the electronic device. The base station may receive beam quality reports from the electronic device. The beam quality reports may be generated at the electronic device in response to reception of the first downlink reference signals by a first set of antennas in the phased antenna array of the electronic device. The base station may receive uplink signals from the electronic device that include information about receive signal beams formable by the phased antenna array. Control circuitry on the base station may identify an optimal receive signal beam for the phased antenna array based on the received beam quality reports and the received information about the receive signal beams. The base station may then transmit second downlink signals to the electronic device. The second downlink signals may instruct the electronic device to use a second set of antennas in the phased antenna array to form the optimal receive signal beam. The information about the receive signal beams received from the electronic device may include a channel information reference signal (CSI-RS) report invalidation message or power savings priority values associated with the receive signal beams, as examples.

In another suitable arrangement, a first set of antennas in the phased antenna array on the electronic device may transmit uplink signals to the wireless base station at an output power level. Control circuitry on the electronic device may determine whether the output power level can be achieved using a second set of antennas with greater power savings for the electronic device than transmitting the uplink signals using the first set of antennas. In response to determining that the first output power level can be achieved using the second set of antennas with greater power savings, the first set of antennas may transmit a sounding reference signal (SRS) request to the wireless base station. The phased antenna array may receive an SRS grant from the wireless base station. In response to receiving the SRS grant, the control circuitry may control the second set of antennas to transmit a sounding reference signal to the wireless base station.

DETAILED DESCRIPTION

Figure 1:
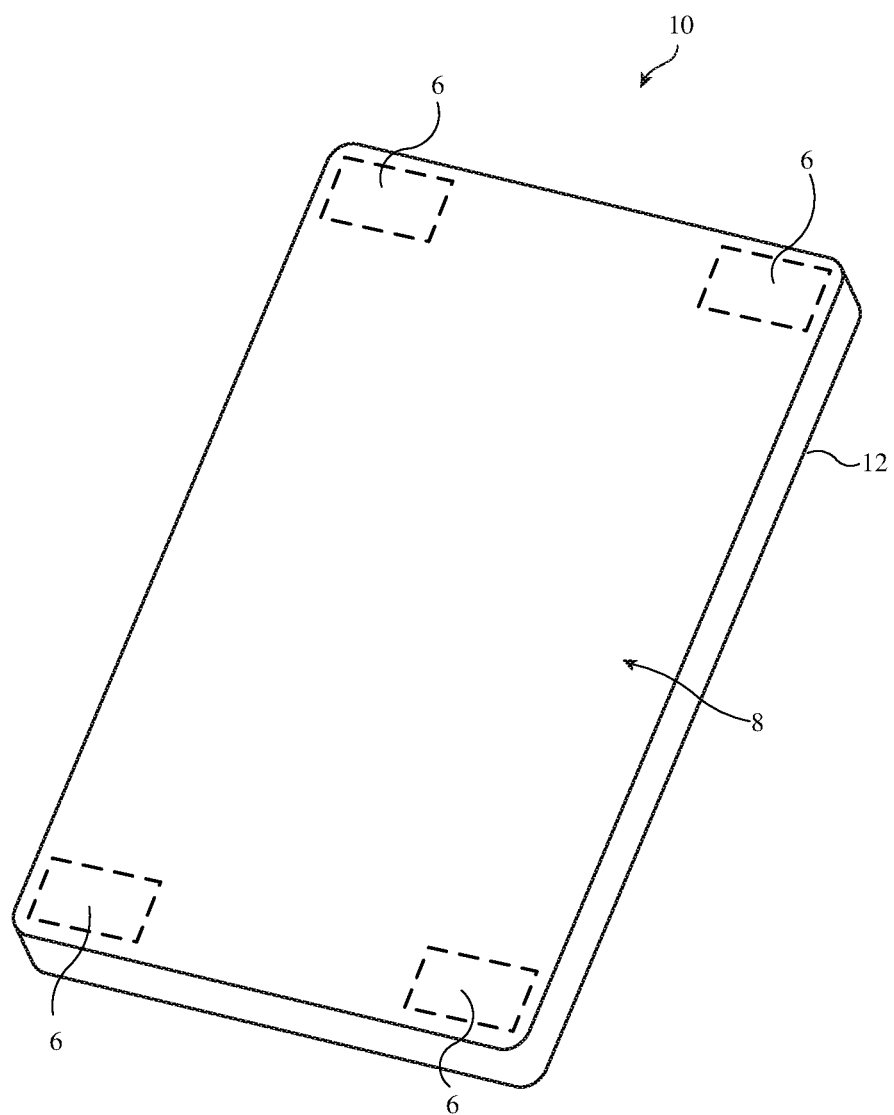
FIG. 1 is a front perspective view of an illustrative electronic device with wireless circuitry in accordance with some embodiments.

An electronic device such as electronic device 10 of FIG. 1 may contain wireless circuitry. The wireless circuitry may include one or more antennas. The antennas may include phased antenna arrays and other antennas (e.g., antennas that do not form part of a phased antenna array) that transmit radio-frequency signals to external equipment such as a wireless base station and that receive radio-frequency signals from the wireless base station. The radio-frequency signals may be conveyed using 5G New Radio (5G NR) communications bands or any other desired communications bands. The radio-frequency signals may include millimeter wave signals, sometimes referred to as extremely high frequency (EHF) signals, which propagate at frequencies above about 30 GHz (e.g., at 60 GHz or other frequencies between about 30 GHz and 300 GHz). The radio-frequency signals may also include centimeter wave signals, which propagate at frequencies between about 10 GHz and 30 GHz. The radio-frequency signals may also include signals at frequencies less than 10 GHz, such as signals between about 410 MHz and 7125 MHz. In scenarios where the radio-frequency signals are conveyed using 5G NR communications bands, the radio-frequency signals may be conveyed in 5G NR communications bands within 5G NR Frequency Range 2 (FR2), which includes centimeter and millimeter wave frequencies between about 24 GHz and 100 GHz, and/or 5G NR communications bands within 5G NR Frequency Range 1 (FR1), which includes frequencies below 7125 MHz. If desired, device 10 may also contain antennas for handling satellite navigation system signals, cellular telephone signals (e.g., radio-frequency signals conveyed using long term evolution (LTE) communications bands or other non-5G NR communications bands), wireless local area network signals, near-field communications, light-based wireless communications, or other wireless communications.

Electronic device 10 (sometimes referred to herein as user equipment (UE) 10) may be a computing device such as a laptop computer, a computer monitor containing an embedded computer, a tablet computer, a cellular telephone, a media player, or other handheld or portable electronic device, a smaller device such as a wristwatch device, a pendant device, a headphone or earpiece device, a virtual or augmented reality headset device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, a wireless access point or base station, a desktop computer, a portable speaker, a keyboard, a gaming controller, a gaming system, a computer mouse, a mousepad, a trackpad or touchpad, equipment that implements the functionality of two or more of these devices, or other electronic equipment. In the illustrative configuration of FIG. 1, device 10 is a portable device such as a cellular telephone, media player, tablet computer, portable speaker, or other portable computing device. Other configurations may be used for device 10 if desired. The example of FIG. 1 is merely illustrative.

As shown in FIG. 1, device 10 may include a display such as display 8. Display 8 may be mounted in a housing such as housing 12. Housing 12, which may sometimes be referred to as an enclosure or case, may be formed of plastic, glass, ceramics, fiber composites, metal (e.g., stainless steel, aluminum, etc.), other suitable materials, or a combination of any two or more of these materials. Housing 12 may be formed using a unibody configuration in which some or all of housing 12 is machined or molded as a single structure or may be formed using multiple structures (e.g., an internal frame structure, one or more structures that form exterior housing surfaces, etc.).

Display 8 may be a touch screen display that incorporates a layer of conductive capacitive touch sensor electrodes or other touch sensor components (e.g., resistive touch sensor components, acoustic touch sensor components, force-based touch sensor components, light-based touch sensor components, etc.) or may be a display that is not touch-sensitive. Capacitive touch sensor electrodes may be formed from an array of indium tin oxide pads or other transparent conductive structures.

Display 8 may include an array of display pixels formed from liquid crystal display (LCD) components, an array of electrophoretic display pixels, an array of plasma display pixels, an array of organic light-emitting diode display pixels, an array of electrowetting display pixels, or display pixels based on other display technologies.

Display 8 may be protected using a display cover layer such as a layer of transparent glass, clear plastic, sapphire, or other transparent dielectrics. Openings may be formed in the display cover layer. For example, openings may be formed in the display cover layer to accommodate one or more buttons, sensor circuitry such as a fingerprint sensor or light sensor, ports such as a speaker port or microphone port, etc. Openings may be formed in housing 12 to form communications ports (e.g., an audio jack port, a digital data port, charging port, etc.). Openings in housing 12 may also be formed for audio components such as a speaker and/or a microphone.

Antennas may be mounted in housing 12. If desired, some of the antennas (e.g., antenna arrays that implement beam steering, etc.) may be mounted under an inactive border region of display 8 (see, e.g., illustrative antenna locations 6 of FIG. 1). Display 8 may contain an active area with an array of pixels (e.g., a central rectangular portion). Inactive areas of display 8 are free of pixels and may form borders for the active area. If desired, antennas may also operate through dielectric-filled openings in the rear of housing 12 or elsewhere in device 10.

To avoid disrupting communications when an external object such as a human hand or other body part of a user blocks one or more antennas, antennas may be mounted at multiple locations in housing 12. Sensor data such as proximity sensor data, real-time antenna impedance measurements, signal quality measurements such as received signal strength information, and other data may be used in determining when one or more antennas is being adversely affected due to the orientation of housing 12, blockage by a user's hand or other external object, or other environmental factors. Device 10 can then switch one or more replacement antennas into use in place of the antennas that are being adversely affected.

Antennas may be mounted at the corners of housing 12 (e.g., in corner locations 6 of FIG. 1 and/or in corner locations on the rear of housing 12), along the peripheral edges of housing 12, on the rear of housing 12, under the display cover glass or other dielectric display cover layer that is used in covering and protecting display 8 on the front of device 10, over a dielectric window on a rear face of housing 12 or the edge of housing 12, over a dielectric cover layer such as a dielectric rear housing wall that covers some or all of the rear face of device 10, or elsewhere in device 10.

Figure 2:
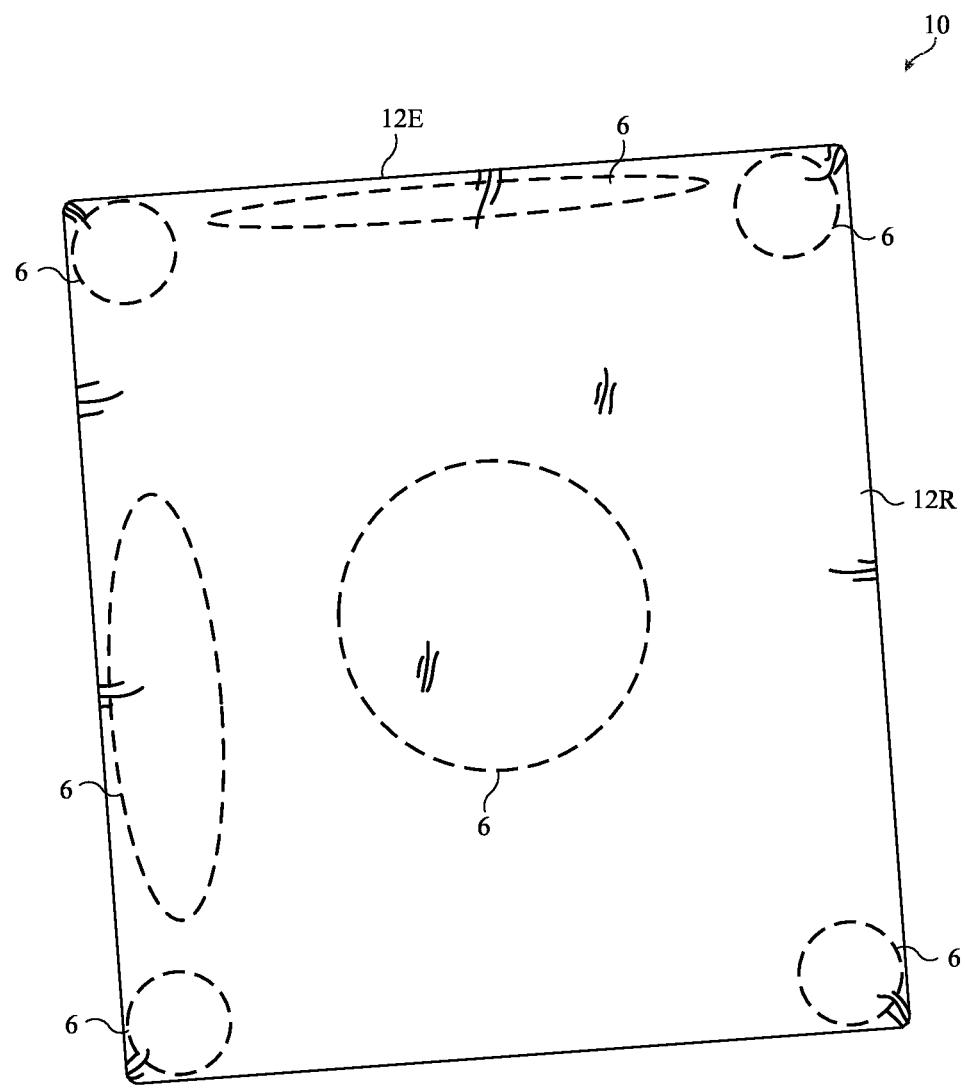
FIG. 2 is a rear perspective view of an illustrative electronic device with wireless circuitry in accordance with some embodiments.

FIG. 2 is a rear perspective view of electronic device 10 showing illustrative locations 6 on the rear and sides of housing 12 in which antennas (e.g., single antennas and/or phased antenna arrays) may be mounted in device 10. The antennas may be mounted at the corners of device 10, along the edges of housing 12 such as edges formed by sidewalls 12E, on upper and lower portions of rear housing wall 12R, in the center of rear housing wall 12R (e.g., under a dielectric window structure or other antenna window in the center of rear housing wall 12R), at the corners of rear housing wall 12R (e.g., on the upper left corner, upper right corner, lower left corner, and lower right corner of the rear of housing 12 and device 10), etc.

In configurations in which housing 12 is formed entirely or nearly entirely from a dielectric (e.g., plastic, glass, sapphire, ceramic, fabric, etc.), the antennas may transmit and receive antenna signals through any suitable portion of the dielectric. In configurations in which housing 12 is formed from a conductive material such as metal, regions of the housing such as slots or other openings in the metal may be filled with plastic or other dielectrics. The antennas may be mounted in alignment with the dielectric in the openings. These openings, which may sometimes be referred to as dielectric antenna windows, dielectric gaps, dielectric-filled openings, dielectric-filled slots, elongated dielectric opening regions, etc., may allow antenna signals to be transmitted to external wireless equipment from the antennas mounted within the interior of device 10 and may allow internal antennas to receive antenna signals from external wireless equipment. In another suitable arrangement, the antennas may be mounted on the exterior of conductive portions of housing 12.

FIGS. 1 and 2 are merely illustrative. In general, housing 12 may have any desired shape (e.g., a rectangular shape, a cylindrical shape, a spherical shape, combinations of these, etc.). Display 8 of FIG. 1 may be omitted if desired. Antennas may be located within housing 12, on housing 12, and/or external to housing 12.

Figure 3:
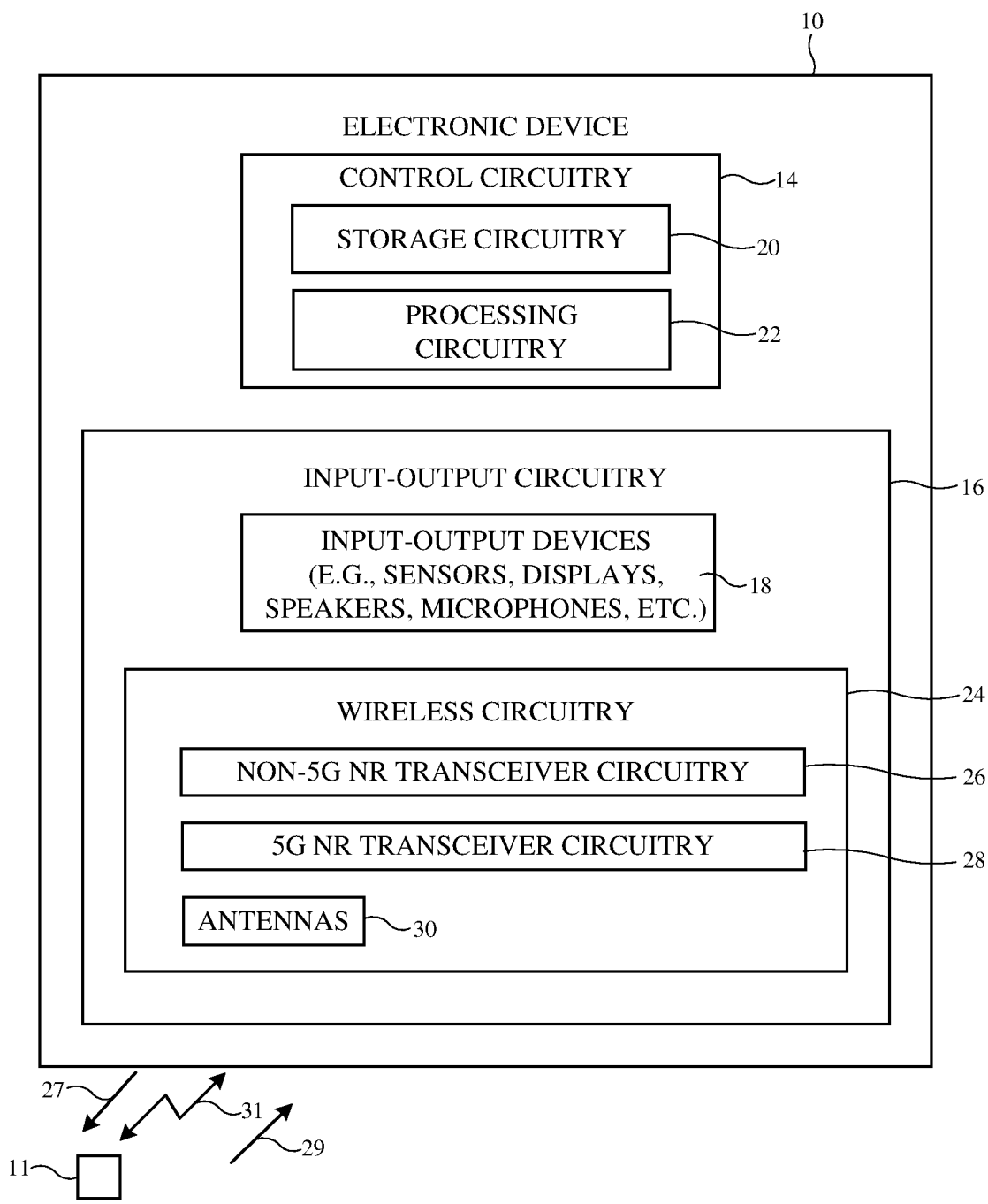
FIG. 3 is a schematic diagram of an illustrative electronic device with wireless circuitry for communicating with a wireless base station in accordance with some embodiments.

A schematic diagram of illustrative components that may be used in device 10 is shown in FIG. 3. As shown in FIG. 3, device 10 may include control circuitry 14. Control circuitry 14 may include storage such as storage circuitry 20. Storage circuitry 20 may include hard disk drive storage, nonvolatile memory (e.g., flash memory or other electrically-programmable-read-only memory configured to form a solid-state drive), volatile memory (e.g., static or dynamic random-access-memory), etc. Control circuitry 14 may include processing circuitry such as processing circuitry 22. Processing circuitry 22 may be used to control the operation of device Processing circuitry 22 may include on one or more microprocessors, microcontrollers, digital signal processors, host processors, baseband processor integrated circuits, application specific integrated circuits, central processing units (CPUs), etc. Control circuitry 14 may be configured to perform operations in device 10 using hardware (e.g., dedicated hardware or circuitry), firmware, and/or software. Software code for performing operations in device 10 may be stored on storage circuitry 20 (e.g., storage circuitry 20 may include non-transitory (tangible) computer readable storage media that stores the software code). The software code may sometimes be referred to as program instructions, software, data, instructions, or code. Software code stored on storage circuitry 20 may be executed by processing circuitry 22.

Control circuitry 14 may be used to run software on device 10 such as internet browsing applications, voice-over-internet-protocol (VOIP) telephone call applications, email applications, media playback applications, operating system functions, etc. To support interactions with external equipment, control circuitry 14 may be used in implementing communications protocols. Communications protocols that may be implemented using control circuitry 14 include internet protocols, wireless local area network protocols (e.g., IEEE 802.11 protocols—sometimes referred to as WiFi®), protocols for other short-range wireless communications links such as the Bluetooth® protocol or other WPAN protocols, IEEE 802.11ad protocols, cellular telephone protocols, MIMO protocols, antenna diversity protocols, satellite navigation system protocols, antenna-based spatial ranging protocols (e.g., radio detection and ranging (RADAR) protocols or other desired range detection protocols for signals conveyed at millimeter and centimeter wave frequencies), etc. Each communication protocol may be associated with a corresponding radio access technology (RAT) that specifies the physical connection methodology used in implementing the protocol. In one suitable arrangement that is sometimes described herein as an example, control circuitry 14 is used in implementing a $3^{rd}$ Generation Partnership Project (3GPP) and $5^{th}$ generation wireless systems (5G) communications protocol such as a 5G NR communications protocol. Wireless circuitry 24 in device 10 may also be implemented using a 5G NR RAT and control circuitry 14 may control wireless circuitry 24 based on the 5G NR RAT.

Device 10 may include input-output circuitry 16. Input-output circuitry 16 may include input-output devices 18.

Input-output devices 18 may be used to allow data to be supplied to device 10 and to allow data to be provided from device 10 to external devices. Input-output devices 18 may include user interface devices, data port devices, sensors, and other input-output components. For example, input-output devices may include touch screens, displays without touch sensor capabilities, buttons, joysticks, scrolling wheels, touch pads, key pads, keyboards, microphones, cameras, speakers, status indicators, light sources, audio jacks and other audio port components, digital data port devices, light sensors, gyroscopes, accelerometers or other components that can detect motion and device orientation relative to the Earth, capacitance sensors, proximity sensors (e.g., a capacitive proximity sensor and/or an infrared proximity sensor), magnetic sensors, and other sensors and input-output components.

Input-output circuitry 16 may include wireless circuitry such as wireless circuitry 24 for wirelessly conveying radio-frequency signals. While control circuitry 14 is shown separately from wireless circuitry 24 in the example of FIG. 3 for the sake of clarity, wireless circuitry 24 may include processing circuitry that forms a part of processing circuitry 22 and/or storage circuitry that forms a part of storage circuitry 20 of control circuitry 14 (e.g., portions of control circuitry 14 may be implemented on wireless circuitry 24). As an example, control circuitry 14 may include baseband processor circuitry or other control components that form a part of wireless circuitry 24.

Wireless circuitry 24 may include radio-frequency transceiver circuitry that is used in conveying radio-frequency signals using the 5G NR communications protocol and RAT such as 5G NR transceiver circuitry 28. 5G NR transceiver circuitry 28 may support communications at frequencies between about 24 GHz and 100 GHz (e.g., within FR2) and/or at frequencies between about 410 MHz and 7125 MHz (e.g., within FR1). Examples of frequency bands that may be covered by 5G NR transceiver circuitry 28 include an IEEE K communications band between about 18 GHz and 27 GHz, a K a communications band between about 26.5 GHz and 40 GHz, a $K_u$ communications band between about 12 GHz and 18 GHz, a V communications band between about 40 GHz and 75 GHz, a W communications band between about 75 GHz and 110 GHz, and/or other frequency bands between approximately 10 GHz and 110 GHz, a C-band between about 3300 MHz and 5000 MHz, an S-band between about 2300 MHz and 2400 MHz, an L-band between about 1432 MHz and 1517 MHz, and/or other frequency bands between approximately 410 MHz and 7125 MHz. 5G NR transceiver circuitry 28 may be formed from one or more integrated circuits (e.g., multiple integrated circuits mounted on a common printed circuit in a system-in-package device, one or more integrated circuits mounted on different substrates, etc.).

Wireless communications using 5G NR transceiver circuitry 28 may be bidirectional. For example, 5G NR transceiver circuitry 28 may convey radio-frequency signals 31 to and from external wireless equipment such as external equipment 11. External equipment 11 may be another electronic device such as electronic device 10, may be a wireless access point, may be a wireless base station, etc. Arrangements in which external equipment 11 is a wireless base station are sometimes described herein as an example. External equipment 11 may therefore sometimes be referred to herein as base station 11.

Radio-frequency signals 31 (sometimes referred to herein as wireless link 31) may include radio-frequency signals transmitted by device 10 to base station 11 (e.g., in uplink direction 27) and radio-frequency signals transmitted by base station 11 to device 10 (e.g., in downlink direction 29). The radio-frequency signals 31 conveyed in uplink direction 27 may sometimes be referred to herein as uplink signals. The radio-frequency signals in downlink direction 29 may sometimes be referred to herein as downlink signals. Radio-frequency signals 31 may be used to convey wireless data. The wireless data may include a stream of data arranged into data packets, symbols, frames, etc. The wireless data may be organized/formatted according to the communications protocol governing the wireless link between device 10 and base station 11 (e.g., a 5G NR communications protocol). Wireless data conveyed by the uplink signals transmitted by device 10 (e.g., in uplink direction 27) may sometimes be referred to herein as uplink data. Wireless data conveyed by the downlink signals transmitted by base station 11 in (e.g., in downlink direction 29) may sometimes be referred to herein as downlink data. The wireless data may, for example, include data that has been encoded into corresponding data packets such as wireless data associated with a telephone call, streaming media content, internet browsing, wireless data associated with software applications running on device 10, email messages, etc.

If desired, wireless circuitry 24 may also include transceiver circuitry for handling communications in non-5G NR communications bands such as non-5G NR transceiver circuitry 26. Non-5G NR transceiver circuitry 26 may include wireless local area network (WLAN) transceiver circuitry that handles 2.4 GHz and 5 GHz bands for Wi-Fi® (IEEE 802.11) communications, wireless personal area network (WPAN) transceiver circuitry that handles the 2.4 GHz Bluetooth® communications band, cellular telephone transceiver circuitry that handles cellular telephone communications bands from 700 to 960 MHz, 1710 to 2170 MHz, 2300 to 2700 MHz, and/or or any other desired cellular telephone communications bands between 600 MHz and 4000 MHz (e.g., cellular telephone signals conveyed using a 4G LTE protocol, a 3G protocol, or other non-5G NR protocols), GPS receiver circuitry that receives GPS signals at 1575 MHz or signals for handling other satellite positioning data (e.g., GLONASS signals at 1609 MHz), television receiver circuitry, AM/FM radio receiver circuitry, paging system transceiver circuitry, near field communications (NFC) circuitry, etc. Non-5G NR transceiver circuitry 26 and 5G NR transceiver circuitry 28 may each include one or more integrated circuits, power amplifier circuitry, low-noise input amplifiers, passive radio-frequency components, switching circuitry, transmission line structures, and other circuitry for handling radio-frequency signals.

Wireless circuitry 24 may include antennas 30. Non-5G NR transceiver circuitry 26 may transmit and receive radio-frequency signals below 10 GHz (and organized according to a non-5G NR communications protocol) using one or more antennas 30. 5G NR transceiver circuitry 28 may transmit and receive radio-frequency signals (e.g., at FR1 and/or FR2 frequencies including frequencies above 10 GHz) using antennas 30.

In satellite navigation system links, cellular telephone links, and other long-range links, radio-frequency signals are typically used to convey data over thousands of feet or miles. In Wi-Fi® and Bluetooth® links at 2.4 and 5 GHz and other short-range wireless links, radio-frequency signals are typically used to convey data over tens or hundreds of feet. 5G NR transceiver circuitry 28 may convey radio-frequency signals over short distances that travel over a line-of-sight path. To enhance signal reception for 5G NR communications, and particularly for communications at frequencies greater than 10 GHz, phased antenna arrays and beam forming (steering) techniques may be used (e.g., schemes in which antenna signal phase and/or magnitude for each antenna in an array are adjusted to perform beam steering). Antenna diversity schemes may also be used to ensure that the antennas that have become blocked or that are otherwise degraded due to the operating environment of device 10 can be switched out of use and higher-performing antennas used in their place.

Antennas 30 in wireless circuitry 24 may be formed using any suitable antenna types. For example, antennas 30 may include antennas with resonating elements that are formed from stacked patch antenna structures, loop antenna structures, patch antenna structures, inverted-F antenna structures, slot antenna structures, planar inverted-F antenna structures, monopole antenna structures, dipole antenna structures, helical antenna structures, Yagi (Yagi-Uda) antenna structures, hybrids of these designs, etc. If desired, one or more of antennas 30 may be cavity-backed antennas. Different types of antennas may be used for different bands and combinations of bands. For example, one type of antenna may be used in forming non-5G NR wireless links for non-5G NR transceiver circuitry 26 and another type of antenna may be used in conveying radio-frequency signals in 5G NR communications bands for 5G NR transceiver circuitry 28. If desired, antennas 30 that are used to convey radio-frequency signals for 5G NR transceiver circuitry 28 may be arranged in one or more phased antenna arrays.

Figure 4:
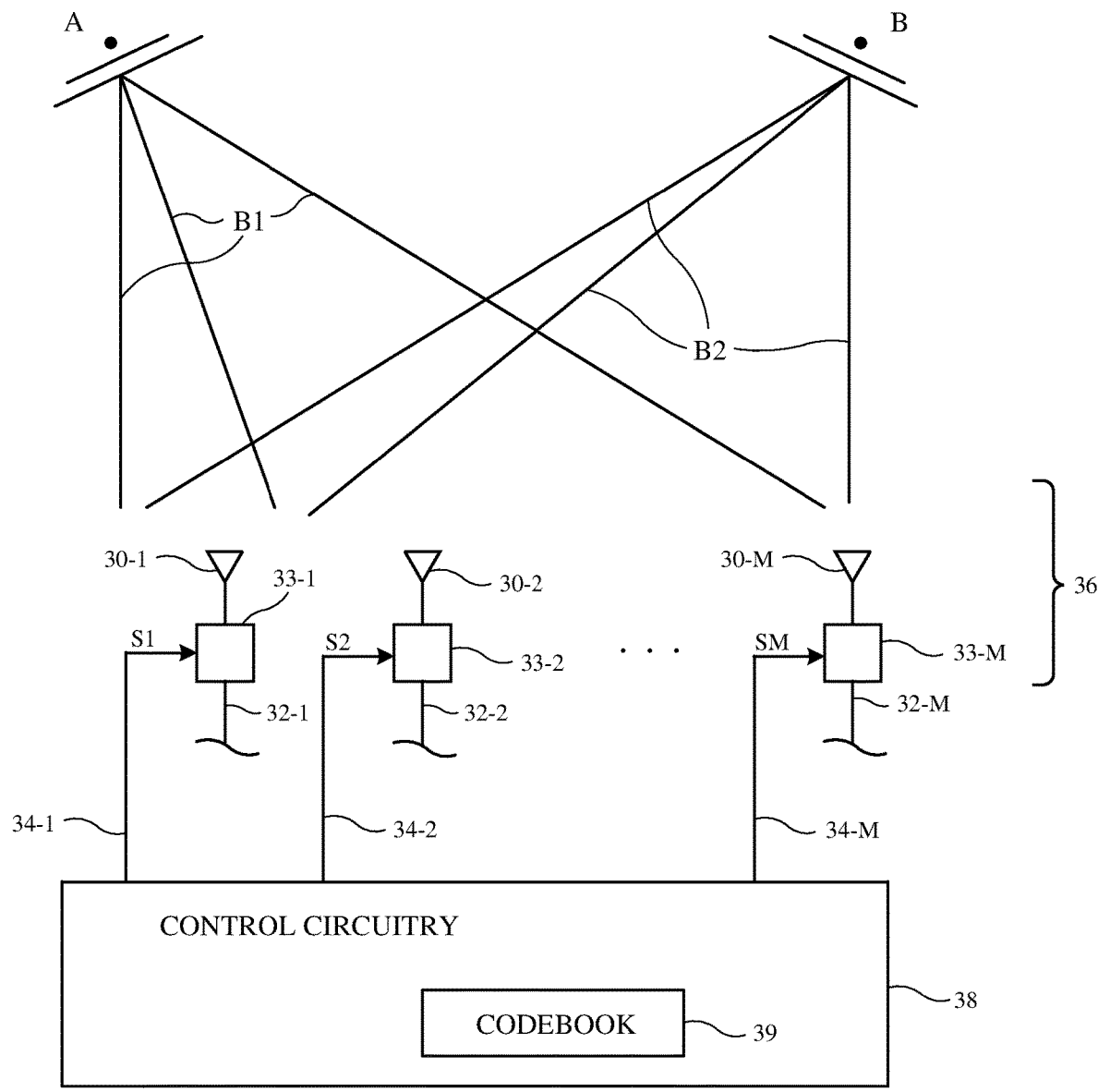
FIG. 4 is a diagram of an illustrative phased antenna array that forms a radio-frequency signal beam at different beam pointing angles in accordance with some embodiments.

FIG. 4 is a diagram showing how antennas 30 for handling radio-frequency signals in 5G NR communications bands (e.g., at frequencies greater than 10 GHz) may be formed in a phased antenna array. As shown in FIG. 4, phased antenna array 36 (sometimes referred to herein as array 36, antenna array 36, or array 36 of antennas 30) may be coupled to radio-frequency transmission line paths 32. For example, a first antenna 30-1 in phased antenna array 36 may be coupled to a first radio-frequency transmission line path 32-1, a second antenna 30-2 in phased antenna array 36 may be coupled to a second radio-frequency transmission line path 32-2, an Mth antenna 30-M in phased antenna array 36 may be coupled to an Mth radio-frequency transmission line path 32-M, etc. While antennas 30 are described herein as forming a phased antenna array, the antennas 30 in phased antenna array 36 may sometimes also be referred to as collectively forming a single phased array antenna (e.g., where each antenna 30 in the phased array antenna forms an antenna element of the phased array antenna).

Radio-frequency transmission line paths 32 may each be coupled to 5G NR transceiver circuitry 28 of FIG. 3. Each radio-frequency transmission line path 32 may include one or more radio-frequency transmission lines, a positive signal conductor, and a ground signal conductor. The positive signal conductor may be coupled to a positive antenna feed terminal on an antenna resonating element of the corresponding antenna 30. The ground signal conductor may be coupled to a ground antenna feed terminal on an antenna ground for the corresponding antenna 30.

Radio-frequency transmission line paths 32 may include stripline transmission lines (sometimes referred to herein simply as striplines), coaxial cables, coaxial probes realized by metalized vias, microstrip transmission lines, edge-coupled microstrip transmission lines, edge-coupled stripline transmission lines, waveguide structures, conductive vias, combinations of these, etc. Multiple types of transmission lines may be used to couple the millimeter/centimeter wave transceiver circuitry to phased antenna array 36. Filter circuitry, switching circuitry, impedance matching circuitry, phase shifter circuitry, amplifier circuitry, and/or other circuitry may be interposed on radio-frequency transmission line path 32, if desired.

Radio-frequency transmission lines in device 10 may be integrated into ceramic substrates, rigid printed circuit boards, and/or flexible printed circuits. In one suitable arrangement, radio-frequency transmission lines in device 10 may be integrated within multilayer laminated structures (e.g., layers of a conductive material such as copper and a dielectric material such as a resin that are laminated together without intervening adhesive) that may be folded or bent in multiple dimensions (e.g., two or three dimensions) and that maintain a bent or folded shape after bending (e.g., the multilayer laminated structures may be folded into a particular three-dimensional shape to route around other device components and may be rigid enough to hold its shape after folding without being held in place by stiffeners or other structures). All of the multiple layers of the laminated structures may be batch laminated together (e.g., in a single pressing process) without adhesive (e.g., as opposed to performing multiple pressing processes to laminate multiple layers together with adhesive).

Antennas 30 in phased antenna array 36 may be arranged in any desired number of rows and columns or in any other desired pattern (e.g., the antennas need not be arranged in a grid pattern having rows and columns). During signal transmission operations, radio-frequency transmission line paths 32 may be used to supply signals (e.g., radio-frequency signals such as millimeter wave and/or centimeter wave signals) from 5G NR transceiver circuitry 28 (FIG. 3) to phased antenna array 36 for wireless transmission. During signal reception operations, radio-frequency transmission line paths 32 may be used to convey signals received at phased antenna array 36 (e.g., from base station 11 of FIG. 3) to 5G NR transceiver circuitry 28 (FIG. 3).

The use of multiple antennas 30 in phased antenna array 36 allows radio-frequency beam forming arrangements (sometimes referred to herein as radio-frequency beam steering arrangements) to be implemented by controlling the relative phases and magnitudes (amplitudes) of the radio-frequency signals conveyed by the antennas. In the example of FIG. 4, the antennas 30 in phased antenna array 36 each have a corresponding radio-frequency phase and magnitude controller 33 (e.g., a first phase and magnitude controller 33-1 interposed on radio-frequency transmission line path 32-1 may control phase and magnitude for radio-frequency signals handled by antenna 30-1, a second phase and magnitude controller 33-2 interposed on radio-frequency transmission line path 32-2 may control phase and magnitude for radio-frequency signals handled by antenna 30-2, an Mth phase and magnitude controller 33-M interposed on radio-frequency transmission line path 32-M may control phase and magnitude for radio-frequency signals handled by antenna 30-M, etc.).

Phase and magnitude controllers 33 may each include circuitry for adjusting the phase of the radio-frequency signals on radio-frequency transmission line paths 32 (e.g., phase shifter circuits) and/or circuitry for adjusting the magnitude of the radio-frequency signals on radio-frequency transmission line paths 32 (e.g., power amplifier and/or low noise amplifier circuits). Phase and magnitude controllers 33 may sometimes be referred to collectively herein as beam steering or beam forming circuitry (e.g., beam steering circuitry that steers the beam of radio-frequency signals transmitted and/or received by phased antenna array 36).

Phase and magnitude controllers 33 may adjust the relative phases and/or magnitudes of the transmitted signals that are provided to each of the antennas in phased antenna array 36 and may adjust the relative phases and/or magnitudes of the received signals that are received by phased antenna array 36. Phase and magnitude controllers 33 may, if desired, include phase detection circuitry for detecting the phases of the received signals that are received by phased antenna array 36. The term "beam," "signal beam," "radio-frequency beam," or "radio-frequency signal beam" may be used herein to collectively refer to wireless signals that are transmitted and received by phased antenna array 36 in a particular direction. The signal beam may exhibit a peak gain that is oriented in a particular beam pointing direction at a corresponding beam pointing angle (e.g., based on constructive and destructive interference from the combination of signals from each antenna in the phased antenna array). The term "transmit signal beam" may sometimes be used herein to refer to radio-frequency signals that are transmitted in a particular direction whereas the term "receive beam" may sometimes be used herein to refer to radio-frequency signals that are received from a particular direction.

If, for example, phase and magnitude controllers 33 are adjusted to produce a first set of phases and/or magnitudes for transmitted radio-frequency signals, the transmitted signals will form a transmit beam as shown by beam B1 of FIG. 4 that is oriented in the direction of point A. If, however, phase and magnitude controllers 33 are adjusted to produce a second set of phases and/or magnitudes for the transmitted signals, the transmitted signals will form a transmit beam as shown by beam B2 that is oriented in the direction of point B. Similarly, if phase and magnitude controllers 33 are adjusted to produce the first set of phases and/or magnitudes, radio-frequency signals (e.g., radio-frequency signals in a receive beam) may be received from the direction of point A, as shown by beam B1. If phase and magnitude controllers 33 are adjusted to produce the second set of phases and/or magnitudes, radio-frequency signals may be received from the direction of point B, as shown by beam B2.

Each phase and magnitude controller 33 may be controlled to produce a desired phase and/or magnitude based on a corresponding control signal S received from control circuitry 38 of FIG. 4 over control paths 34 (e.g., the phase and/or magnitude provided by phase and magnitude controller 33-1 may be controlled using control signal 51 on control path 34-1, the phase and/or magnitude provided by phase and magnitude controller 33-2 may be controlled using control signal S2 on control path 34-2, the phase and/or magnitude provided by phase and magnitude controller 33-M may be controlled using control signal SM on control path 34-M, etc.). If desired, control circuitry 38 may actively adjust control signals S in real time to steer the transmit or receive beam in different desired directions (e.g., to different desired beam pointing angles) over time. Phase and magnitude controllers 33 may provide information identifying the phase of received signals to control circuitry 38 if desired.

When performing wireless communications using radio-frequency signals at millimeter and centimeter wave frequencies, the radio-frequency signals are conveyed over a line of sight path between phased antenna array 36 and external wireless equipment (e.g., base station 11 of FIG. 3). If the external wireless equipment is located at point A of FIG. 4, phase and magnitude controllers 33 may be adjusted to steer the signal beam towards point A (e.g., to form a signal beam having a beam pointing angle directed towards point A). Phased antenna array 36 may then transmit and receive radio-frequency signals in the direction of point A. Similarly, if the external wireless equipment is located at point B, phase and magnitude controllers 33 may be adjusted to steer the signal beam towards point B (e.g., to form a signal beam having a beam pointing angle directed towards point B). Phased antenna array 36 may then transmit and receive radio-frequency signals in the direction of point B. In the example of FIG. 4, beam steering is shown as being performed over a single degree of freedom for the sake of simplicity (e.g., towards the left and right on the page of FIG. 4). However, in practice, the beam may be steered over two or more degrees of freedom (e.g., in three dimensions, into and out of the page and to the left and right on the page of FIG. 4). Phased antenna array 36 may have a corresponding field of view over which beam steering can be performed (e.g., in a hemisphere or a segment of a hemisphere over the phased antenna array). If desired, device 10 may include multiple phased antenna arrays that each face a different direction to provide coverage from multiple sides of the device.

Control circuitry 38 of FIG. 4 may form a part of control circuitry 14 of FIG. 3 or may be separate from control circuitry 14 of FIG. 3. Control circuitry 38 of FIG. 4 may identify a desired beam pointing angle for the signal beam of phased antenna array 36 and may adjust the control signals S provided to phased antenna array 36 to configure phased antenna array 36 to form (steer) the signal beam at that beam pointing angle. Each possible beam pointing angle that can be used by phased antenna array 36 during wireless communications may be identified by a beam steering codebook such as codebook 39. Codebook 39 may be stored at control circuitry 38, elsewhere on device 10, or may be located (offloaded) on external equipment and conveyed to device 10 over a wired or wireless communications link.

Codebook 39 may identify each possible beam pointing angle that may be used by phased antenna array 36. Control circuitry 38 may store or identify phase and magnitude settings for phase and magnitude controllers 33 to use in implementing each of those beam pointing angles (e.g., control circuitry 38 or codebook 39 may include information that maps each beam pointing angle for phased antenna array 36 to a corresponding set of phase and magnitude values for phase and magnitude controllers 33). Codebook 39 may be hard-coded or soft-coded into control circuitry 38 or elsewhere in device 10, may include one or more databases stored at control circuitry 38 or elsewhere in device 10 (e.g., codebook 39 may be stored as software code), may include one or more look-up-tables at control circuitry 38 or elsewhere in device 10, and/or may include any other desired data structures stored in hardware and/or software on device 10. Codebook 39 may be generated during calibration of device 10 (e.g., during design, manufacturing, and/or testing of device 10 prior to device 10 being received by an end user) and/or may be dynamically updated over time (e.g., after device 10 has been used by an end user).

Control circuitry 38 may generate control signals S based on codebook 39. For example, control circuitry 38 may identify a beam pointing angle that would be needed to communicate with base station 11 of FIG. 3 (e.g., a beam pointing angle pointing towards base station 11). Control circuitry 38 may subsequently identify the beam pointing angle in codebook 39 that is closest to this identified beam pointing angle. Control circuitry 38 may use codebook 39 to generate phase and magnitude values for phase and magnitude controllers 33. Control circuitry 38 may transmit control signals S identifying these phase and magnitude values to phase and magnitude controllers 33 over control paths 34. The beam formed by phased antenna array 36 using control signals S will be oriented at the beam pointing angle identified by codebook 39. If desired, control circuitry 38 may sweep over some or all of the different beam pointing angles identified by codebook 39 until the external wireless equipment is found and may use the corresponding beam pointing angle at which the external wireless equipment was found to communicate with the external wireless equipment. Examples in which the antennas 30 that are used to convey radio-frequency signals in 5G NR communications bands for 5G NR transceiver circuitry 28 are arranged into one or more phased antenna arrays 36 are described herein as an example. However, if desired, one, more than one, or all of the antennas 30 that are used to convey radio-frequency signals in the 5G NR communications bands for 5G NR transceiver circuitry 28 may be independent antennas that do not form part of a larger phased antenna array.

Each antenna 30 in phased antenna array 36 may be active while transmitting and/or receiving signals. If desired, some of the antennas in phased antenna array 36 (and the corresponding transmit/receive chains) may be inactive while other antennas in phased antenna array 36 (and the corresponding transmit/receive chains) are active for transmitting and/or receiving signals. Control circuitry 38 may control phase and magnitude controllers 33 to selectively activate some antennas 30 and to selectively deactivate other antennas 30. The set of antennas 30 that are active and inactive at any given time may be characterized by a respective antenna scaling setting for phased antenna array 36. For example, phased antenna array 36 may have a first antenna scaling setting at which all M antennas 30 in phased antenna array 36 are active, may have a second antenna scaling setting at which only antenna 30-1 is active, may have a third antenna scaling setting at which only antenna 30-2 is active, may have a fourth antenna scaling setting at which half of the antennas in phased antenna array 36 are active, etc.

Control circuitry 38 may perform antenna scaling operations in which control circuitry 38 switches phased antenna array 36 between two or more antenna scaling settings (e.g., control circuitry 38 may perform antenna scaling operations by switching phased antenna array 36 from an antenna scaling setting where all the antennas 30 in the array are active to an antenna scaling setting in which only a subset of the antennas 30 in the array are active, to an antenna scaling setting in which only one of the antennas 30 in the array are active, etc.). Each antenna scaling setting may have a corresponding number of signal beams (e.g., beam pointing angles) that are formable using phased antenna array 36 while in that antenna scaling setting (e.g., as identified by codebook 39).

In general, phased antenna array 36 is steerable over more possible signal beams when more antennas 30 are active and is steerable over fewer possible signal beams when fewer antennas 30 are active. In addition, phased antenna array 36 may exhibit greater peak gain in each signal beam when more antennas 30 are active than when fewer antennas 30 are active. At the same time, phased antenna array 36 may consume more power when more antennas 30 are active than when fewer antennas 30 are active. If care is not taken, phased antenna array 36 may consume excessive power when more antennas 30 are active than would otherwise be necessary in order to perform wireless communications with satisfactory link quality. Control circuitry 38 may therefore switch phased antenna array 36 between different antenna scaling settings during wireless communications to balance the wireless link quality requirements for device 10 with the amount of power consumed by phased antenna array 36. Control circuitry 38 may monitor the link quality of transmitted and/or received signals as well as power consumption in device 10 to determine when to switch between antenna scaling settings (e.g., to determine when to change the number of active antennas 30 in phased antenna array 36 so that the number of active antennas optimizes wireless link quality and power consumption).

Figure 5:
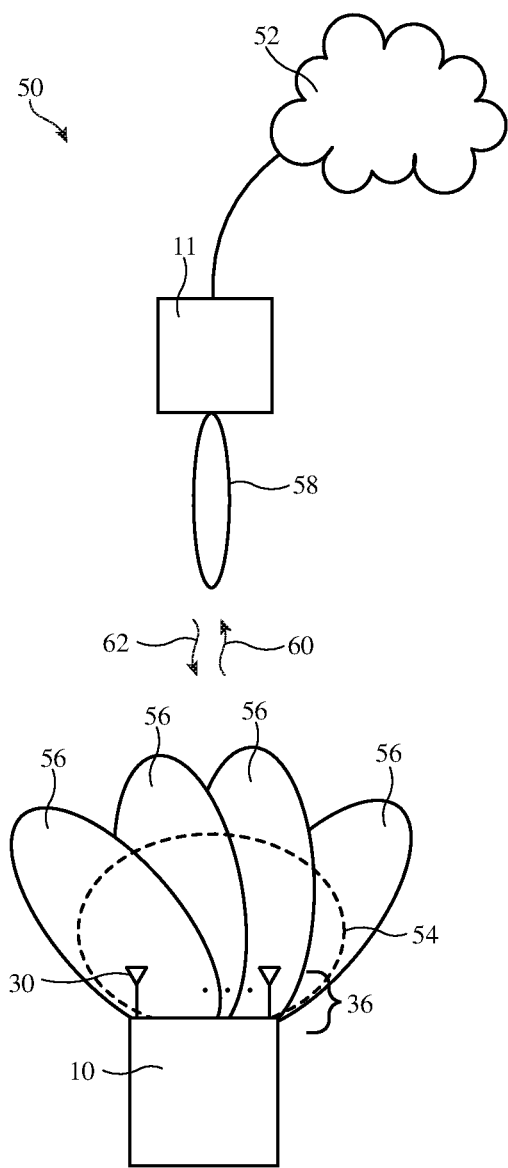
FIG. 5 is a diagram of an illustrative wireless network including an electronic device that communicates with a wireless base station using different antenna scaling settings in accordance with some embodiments.

FIG. 5 is a diagram that shows how device 10 may perform antenna scaling operations in communicating with base station 11. As shown in FIG. 5, wireless network 50 may include device 10 and base station 11. Base station 11 may be communicatively coupled to network 52 (e.g., over wireless and/or wired links). Network 52 may include multiple devices (e.g., devices 10), servers, base stations, access points, switches, routers, or other network devices, local area networks, wireless local area networks, the internet, and/or other networks arranged in any desired network configuration (e.g., using wireless links and/or wired links arranged in any desired network topology). The network devices may include physical devices and/or virtual (logical) devices distributed over one or more underlying physical devices. Network 52 and/or base station 11 may be controlled by a corresponding network operator. Network 52 and base station 11 may convey data from one or more end hosts of network 52 to device 10 (e.g., downlink data) and/or may convey data from device 10 (e.g., uplink data) to one or more end hosts of network 52.

As shown in FIG. 5, base station 11 may produce a signal beam 58 (e.g., using an antenna or a phased antenna array on base station 11). Base station 11 may steer signal beam 58 to point towards device 10 to allow base station 11 to transmit downlink signals 62 to device 10 (e.g., at frequencies in the FR2 frequency range) and to receive uplink signals 60 from device 10 (e.g., at frequencies in the FR2 frequency range). Device 10 may use phased antenna array 36 to transmit uplink signals 60 to base station 11 and to receive downlink signals 62 from base station 11.

As shown in FIG. 5, phased antenna array 36 may have a first antenna scaling setting in which a set (e.g., all) of the antennas 30 in phased antenna array 36 are active and a second setting in which a subset (e.g., one) of the antennas 30 in phased antenna array 36 is active while the remaining antennas 30 in phased antenna array 36 are inactive. In the first antenna scaling setting, phased antenna array 36 may be steerable among multiple possible signal beams 56 (e.g., the active antennas may support multiple beam forming phase vectors such that multiple signal beams 56 are formable). Device 10 may, for example, communicate using a signal beam 56 that points towards base station 11 or that otherwise exhibits the highest link quality for communicating with base station 11 (e.g., the control circuitry on device 10 may control phased antenna array 36 to form the particular signal beam 56 that points closest to base station 11 or signal beam 58). In the second antenna scaling setting, phased antenna array 36 may be capable of forming fewer signal beams than in the first antenna scaling setting. For example, phased antenna array 36 may only be able to form a single signal beam 54 (e.g., because only a single antenna 30 is active). Because signal beams 56 are formed using more antennas than signal beam 54, signal beams 56 may have greater peak gain than signal beam 54.

Communicating using signal beam 54 generally consumes less power than communicating using one of signal beams 56 (e.g., because fewer antennas 30 are active in forming signal beam 54 than in forming each signal beam 56). At the same time, communicating using signal beams 56 may support greater link and beam quality (e.g., because the peak gain of each signal beam 56 is greater than the peak gain of signal beam 54). In scenarios where signal beam 54 is able to provide satisfactory link quality with base station 11, control circuitry on device 10 (e.g., control circuitry 38 of FIG. 4) may communicate using signal beam 54 instead of using signal beams 56 (e.g., by adjusting the antenna scaling setting of phased antenna array 36), thereby conserving power on device 10. In scenarios where signal beam 54 is incapable of performing satisfactory communications, device 10 may communicate using one of signal beams 56 instead of using signal beam 54 (e.g., by adjusting the antenna scaling setting of phased antenna array 36). In the example of FIG. 5, two antenna scaling settings for phased antenna array 36 are illustrated for the sake of simplicity. In general, phased antenna array 36 may have any desired number of antenna scaling settings. Each antenna scaling setting may have a corresponding set of any desired number of formable signal beams that can be produced by the active antennas of that antenna scaling setting (e.g., the control circuitry may steer the phased antenna array among the set of formable signal beams).

If desired, device 10 may also perform antenna polarization scaling. For example, each antenna 30 in phased antenna array 36 may be able to communicate using multiple polarization modes (e.g., a horizontal linearly-polarized mode, a vertical linearly-polarized mode, an elliptical-polarized mode, a circular-polarized mode, etc.). Device 10 may selectively enable polarization modes (e.g., one or both of the horizontal and vertical modes) in communicating with base station 11 (e.g., the antenna scaling settings for phased antenna array 36 may also include corresponding polarization settings and changes to the antenna scaling setting for array 36 may also involve changing which polarizations are covered by array 36).

Device 10 may perform antenna scaling in transmitting uplink signals 60, in receiving downlink signals 62, or in both transmitting uplink signals 60 and receiving downlink signals 62. Device 10 need not use the same antenna scaling settings (e.g., the same set of active antennas and/or polarizations) for both transmitting uplink signals and receiving downlink signals. For example, device 10 may transmit uplink signals 60 using a first set of active antennas (e.g., using a signal beam 56) while concurrently receiving downlink signals 62 using a second set of active antennas (e.g., using a single antenna and signal beam 54). In this way, the control circuitry on device 10 may break transmit and receive signal beam correspondence for phased antenna array 36.

Control circuitry 38 may, for example, break beam correspondence when the optimal allocation of the number of active antennas to meet desired uplink coverage is different than the optimal allocation of the number of active antennas to meet desired downlink coverage. As an example, output power and gain for the antennas on base station 11 is typically greater than that of antennas 30 on device 10, and the number of antennas 30 on device 10 needed to meet a given signal-to-noise ratio (SNR) operating point may be relatively low (e.g., a single antenna and signal beam 54 may be sufficient to meet the SNR operating point for receiving downlink signals 62). In other words, the number of necessary active antennas on device 10 to achieve the target downlink SNR may be different (e.g., lower or higher) than the number of necessary active antennas on device 10 to achieve a target uplink SNR.

The control circuitry on device 10 may gather wireless performance metric information during communications with base station 11 and may determine different antenna scaling switching points (e.g., points at which to switch between antenna scaling settings by changing the number of active antennas) for both uplink and downlink signals based on the wireless performance metric information. The wireless performance metric information may include the receive signal strength of downlink signals 62, the receive signal quality of downlink signals 62, the output power level of phased antenna array 36 in transmitting uplink signals 60, the transmit power headroom of phased antenna array 36, or other performance metric information. In other words, different numbers of active antennas 30 in phased antenna array 36 may offer optimal performance (e.g., by consuming a minimum amount of power while still ensuring that satisfactory communications are performed) depending on whether the antennas are transmitting uplink signals 60 or receiving downlink signals 62. The control circuitry may use wireless performance metric information and power consumption information to identify the optimal number of active antennas to use for transmitting uplink signals 60 and to identify the optimal number of active antennas to use for receiving downlink signals 62, which may be different than the optimal number of active antennas to use for transmitting the uplink signals. The control circuitry may then control phased antenna array 36 to receive downlink signals 62 using the optimal number of active antennas for receiving downlink signals and to transmit uplink signals 60 using the optimal number of active antennas for transmitting uplink signals. Optimal polarization scaling on device 10 may also vary between transmitting uplink signals and receiving downlink signals.

Figure 6:
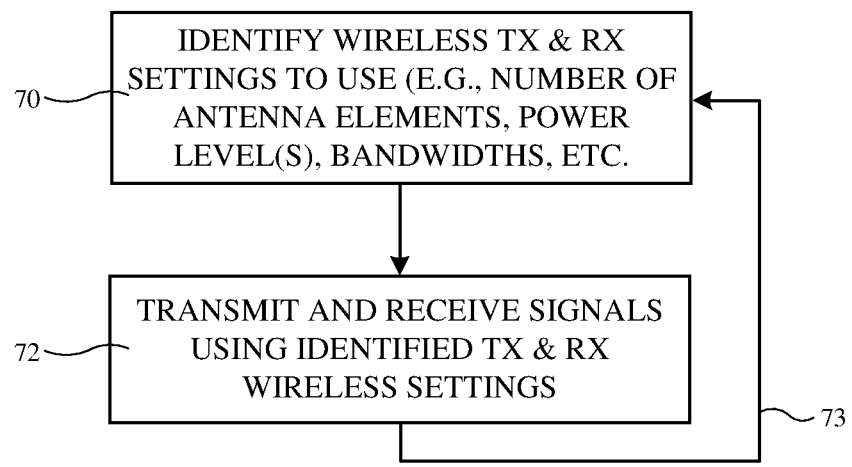
FIG. 6 is a flow chart of illustrative steps that may be processed by an electronic device in performing wireless communications using different antenna scaling settings in accordance with some embodiments.

FIG. 6 is a flow chart of illustrative steps that may be performed by device 10 in performing antenna scaling operations. At step 70, device 10 (e.g., control circuitry 38 of FIG. 3) may identify wireless settings to use for transmitting uplink signals 60 and receiving downlink signals 62.

The wireless settings may include antenna scaling settings. For example, the wireless settings may include a set of antennas 30 that will be active in transmitting uplink signals 60 and a set of antennas 30 that will be active in receiving downlink signals 62. The wireless settings may also include power levels to use, bandwidths to use, resource blocks to use, etc. The control circuitry may gather wireless performance metric information (e.g., receive signal strength, receive signal quality, output power level, transmit power headroom, etc.) and information on past, current, and/or future power consumption in device 10. The control circuitry may determine the set of antennas to use in transmitting uplink signals and the set of antennas to use in receiving downlink signals based on the gathered wireless performance metric information and/or the information on power consumption. The set of antennas used to transmit uplink signals may be different from the set of antennas used to receive downlink signals (e.g., beam correspondence may be broken). At least some of the wireless performance metric information may also be received at device 10 from base station 11. Some of the wireless settings (e.g., information on power levels to use, resource blocks to use, etc.) may be provided in control information received from base station 11. If desired, device 10 may perform antenna scaling operations to comply with maximum permissible exposure (MPE) regulations instead of or in addition to reducing output power level (e.g., antenna scaling can decrease overall output power while mitigating the overall dynamic range that the power amplifier circuitry in device 10 needs to support).

At step 72, device 10 may transmit uplink signals 60 and/or receive downlink signals 62 using the identified wireless settings (e.g., using the identified antenna scaling settings). Processing may loop back to step 70, as shown by arrow 73, and device 10 may update the wireless settings as device and network operating conditions change over time (e.g., device 10 may change the number of active antennas used to transmit and/or receive over time as the wireless performance metric information and power consumption change over time). In this way, device 10 may receive downlink signals 62 and may transmit uplink signals 60 with satisfactory signal and beam quality (e.g., with satisfactory SNR, error rate, etc.) over time while minimizing power consumption in device 10.

In practice, the operating points at which device 10 switches antenna scaling settings (sometimes referred to herein as switching points) are dependent upon a wide range of design parameters for device 10 and, in general, may only be known to device 10 and may be unknown to base station 11 and network 52. If care is not taken, changes in the antenna scaling settings (e.g., changes in the number of active antennas in phased antenna array 36) can impact the power control tolerance of device 10 and can impact beam management procedures at the network level. For example, changes in antenna scaling can introduce a discontinuity in output power density for device 10. If care is not taken, base station 11 and network 52 may incorrectly interpret the discontinuity as a variation in propagation conditions. Beam management metrics gathered by base station 11 and network 52 may also be unoptimized to the current set of active antennas in phased antenna array 36.

Figure 7:
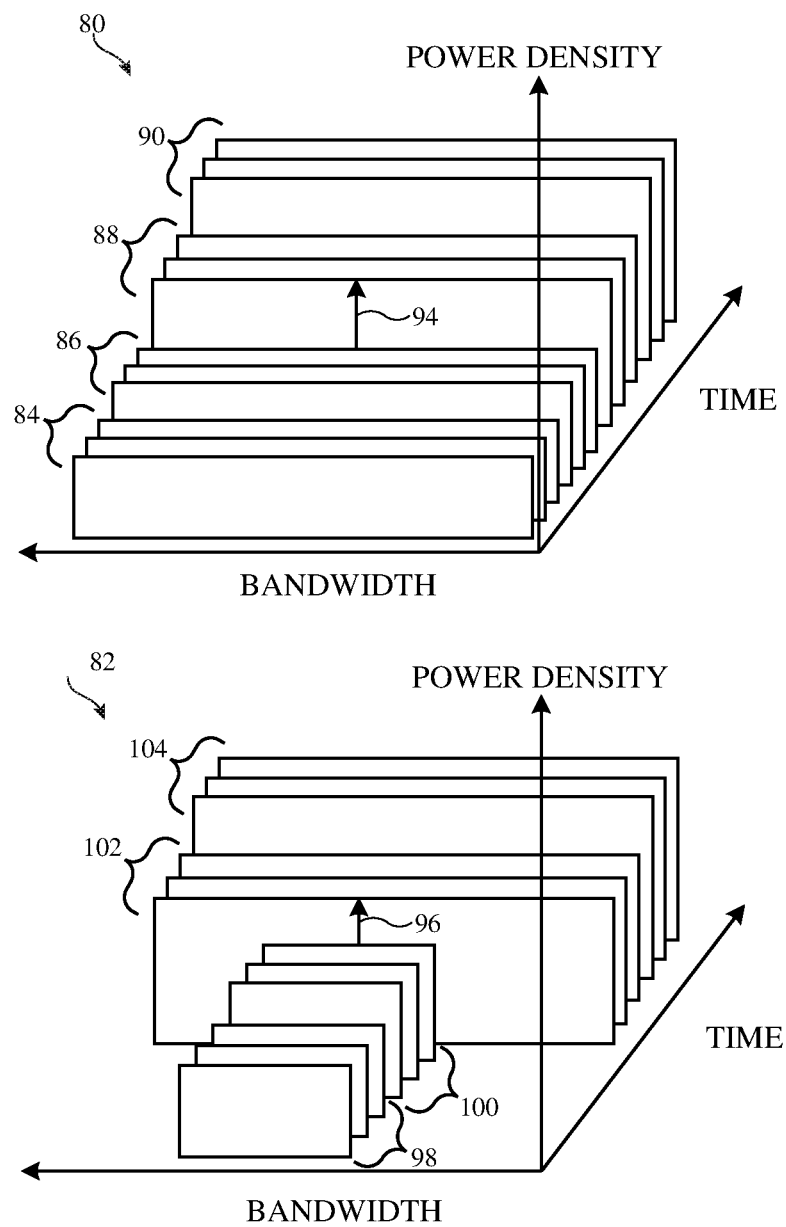
FIG. 7 shows plots that illustrate how different antenna scaling settings may create power density discontinuities for a wireless network in accordance with some embodiments.

FIG. 7 includes plots that illustrate how changes in antenna scaling can introduce discontinuities in output power density for device 10. Plot 80 of FIG. 7 illustrates a scenario where device 10 performs a gradual output power ramp over time. The gradual output power ramp may be performed at the instruction of base station 11 (e.g., using a transmit power control (TPC) loop that instructs device 10 to gradually increase its output power).

As shown in plot 80, device 10 may initially transmit blocks (symbols) 84 at a given output power level and with a first set of active antennas 30. Device 10 may then transmit blocks 86 at an increased output power level using the first set of active antennas 30 (e.g., based on an instruction to increase output power level in a TPC command received from base station 11). At this point, device 10 may determine that the number of active antennas 30 in phased antenna array 36 needs to be increased (e.g., while processing step 70 of FIG. 6). For example, device 10 may determine that the number of active antennas needs to be increased (e.g., that the antenna scaling setting needs to be changed) to ensure that a satisfactory link quality is maintained or achieved with base station 11.

Device 10 may then transmit blocks 88 using a second set of active antennas 30 (e.g., where the second set includes more antennas 30 than the first set). Because more antennas are active, the output power density increases for the transmission of blocks 88, as shown by arrow 94. Device 10 may then transmit blocks 90 using the second set of active antennas and an increased output power level (e.g., based on an instruction to increase output power level in a TPC command received from base station 11). The increase in output power density associated with arrow 94 is greater than the increase in output power associated with the power ramp identified in the TPC instruction from base station 11. The increase in output power density associated with arrow 94 can therefore form an unexpected output power discontinuity from the perspective of base station 11. Base station 11 and thus network 52 may incorrectly interpret this discontinuity as a variation in propagation condition, may incorrectly determine that device 10 has failed the radio-frequency requirements for the power ramp, or may make network decisions that are not well-aligned with the actual behavior of device 10, which may lead to a reduction in overall throughput and network performance.

Plot 82 illustrates an exemplary output power ramp where device 10 is also scheduled to transmit consecutive symbols with varying transmission bandwidths. For example, as shown in plot 82, device 10 may transmit narrow-bandwidth blocks 98 at a first output power level. Device 10 may then transmit narrow-bandwidth blocks 100 at a second output power level that is greater than the first output power level (e.g., based on an instruction to increase output power level in a TPC command received from base station 11). Device 10 may then transmit wide-bandwidth blocks 102 at a third output power level that is greater than the second output power level (e.g., based on an instruction to increase output power level in a TPC command received from base station 11 and based on a change in resource allocation by base station 11). Device 10 may then transmit wide-bandwidth blocks 104 at a fourth output power level that is greater than the second output power level (e.g., based on an instruction to increase output power level in a TPC command received from base station 11). Device 10 may use a first set of active antennas to transmit narrow-bandwidth blocks 98 and 100 but may scale up to use a second set of active antennas (e.g., where the second set includes more active antennas than the first set) for transmission of wide-bandwidth blocks 102 and 104. This increase in the number of active antennas may produce an output power density discontinuity, as shown by arrow 96. Base station 11 and thus network 52 may incorrectly interpret this discontinuity as a variation in propagation condition, may incorrectly determine that device 10 has failed the radio-frequency requirements for the power ramp, or may make network decisions that are not well-aligned with the actual behavior of device 10, which may lead to a reduction in overall throughput and network performance.

Figure 8:
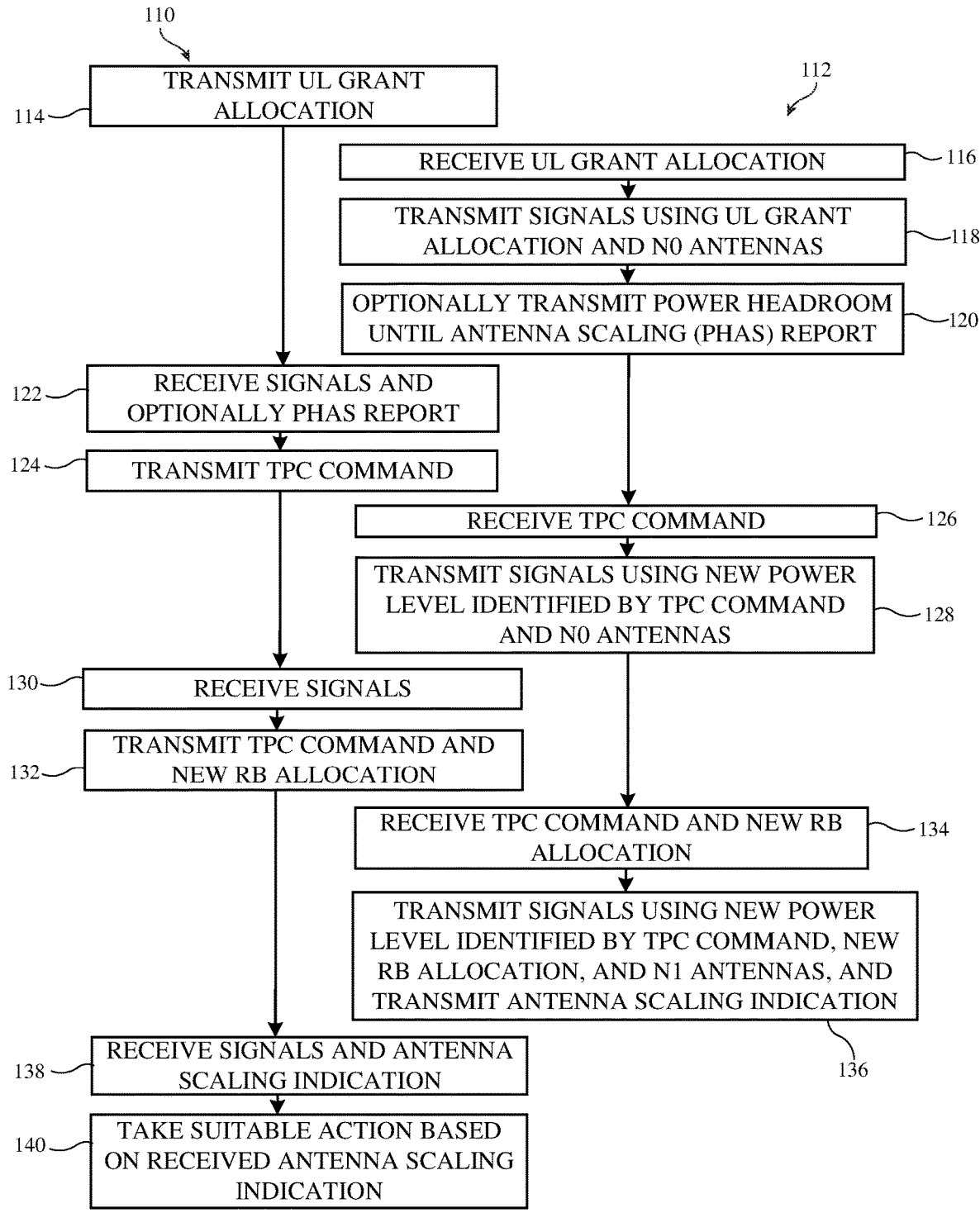
FIG. 8 is a flow chart of illustrative steps that may be performed by a wireless network having an electronic device that informs a wireless base station of a change in uplink antenna scaling settings in accordance with some embodiments.

In order to mitigate these issues (e.g., issues associated unexpected discontinuities in output power density as device 10 performs antenna scaling operations), device 10 may inform base station 11 when antenna scaling operations have occurred. Once informed by the device, the network may be able to tolerate a certain amount of variation in the device's output power. FIG. 8 is a flow chart of steps that may be performed by wireless network 50 of FIG. 5 to accommodate transmit (uplink) antenna scaling operations performed by device 10. Steps 110 of FIG. 8 (e.g., steps 114, 122, 124, 130, 132, 138, and 140) may be performed by base station 11 and/or network 52. Steps 112 of FIG. 8 (e.g., steps 116, 118, 120, 126, 128, 134, and 136) may be performed by device 10.

At step 114, base station 11 may transmit an uplink grant allocation to device 10 (e.g., using signal beam 58 and downlink signals 62 of FIG. 5). Base station 11 may, for example, transmit the uplink grant allocation as downlink control information (DCI) using the physical downlink control channel (PDCCH) of the 5G NR communications protocol. The uplink grant allocation may include an uplink resource block (RB) allocation (e.g., a number of resource blocks R0) and an output power level allocation P0 for device 10 (which can be determined by the device based on transmit power control procedures or determined from TPC control elements transmitted by the network) to use in transmitting uplink signals to base station 11 (e.g., based on a communications schedule maintained by base station 11). The number of resource blocks in the resource block allocation may define the bandwidth allocated to device 10 for transmission of uplink signals.

At step 116, device 10 may receive the uplink grant allocation from base station 11 (e.g., using one or more antennas 30).

At step 118, device 10 may transmit uplink signals (e.g., uplink signals 60 of FIG. 5) using the uplink grant allocation received from base station 11 (e.g., using the R0 resource blocks and output power level P0 allocated to device 10 by base station 11). Device 10 may transmit the uplink signals using a first antenna scaling setting (e.g., using a first set or number N0 of antennas 30 in phased antenna array 36). The number N0 of antennas 30 may include all of the antennas 30 or any desired subset of the antennas 30 in phased antenna array 36. Device may transmit the uplink signals using the physical uplink shared channel (PUSCH), physical uplink control channel (PUCCH), or a sounding reference signal (SRS) of the 5G NR communications protocol, for example.

At optional step 120, device 10 may transmit a power headroom until antenna scaling (PHAS) report to base station 11 (e.g., using the first number N0 of antennas 30). Device 10 may transmit the PHAS report using physical-layer (PHY) signaling, media access control layer control element (MAC CE) signaling, or radio resource control (RRC) signaling. The PHAS report may be based on the implementation of device 10 and may provide pre-emptive information to network 52 about future antenna scaling on device 10 (e.g., information that an antenna scaling operation will be performed by device 10 after the output power level of device reaches a predetermined threshold level). The PHAS report may, for example, identify how much output power headroom exists (e.g., the power level difference between the current output power and the output power level which would trigger antenna scaling) before device 10 will increase the number of active antennas used to transmit uplink signals. Device 10 may generate the PHAS report while processing step 70 of FIG. 6 if desired (e.g., based on wireless performance metric and/or power consumption information gathered at device 10). Step 120 may be omitted if desired. If desired, network 52 and/or base station 11 may configure the predetermined threshold level for the PHAS report using RRC signaling, such that device 10 transmits the PHAS report based on the power level difference reaching the configured predetermined threshold level.

At step 122, base station 11 may receive the uplink signals transmitted by device 10 using the uplink grant allocation and the set of N0 antennas 30 in phased antenna array 36. In scenarios where device 10 sends a PHAS report to base station 11, base station 11 may use the PHAS report to begin to accommodate the future antenna scaling that will be performed by device 10. For example, base station 11 may ignore an output power density discontinuity that will occur due to the future antenna scaling or may perform any other suitable action.

At step 124, base station 11 may transmit a TPC command to device 10 (e.g., using signal beam 58 and downlink signals 62 of FIG. 5). Base station 11 may, for example, transmit the TPC command using the PDCCH of the 5G NR communications protocol. The TPC command may identify an output power level change $\Delta$PI for device 10 to use in subsequent transmissions of uplink signals 60. Output power level change $\Delta$PI may be a decrease in output power level or may be an increase of output power level (e.g., an increase of output power level in a gradual output power level ramp as shown in plots 80 and 82 of FIG. 7).

At step 126, device 10 may receive the TPC command transmitted by base station 11.

At step 128, device 10 may transmit uplink signals (e.g., uplink signals 60 of FIG. 5) using the uplink grant allocation received from base station 11 (e.g., using the R0 resource blocks allocated to device 10) and using an updated output power level (e.g., an output power level P0+$\Delta$P1 based on the change in output power level $\Delta$P1 received in the TPC command). Device 10 may transmit these uplink signals using the first antenna scaling setting (e.g., using the first number N0 of antennas 30 in phased antenna array 36). Device 10 may transmit the uplink signals using the PUSCH, PUCCH, or SRS of the 5G NR communications protocol, for example.

At step 130, base station 11 may receive the uplink signals transmitted by device 10 using the R0 resource blocks, output power level P0+$\Delta$P1, and the set of N0 antennas 30 in phased antenna array 36.

At step 132, base station 11 may transmit another TPC command to device 10 (e.g., using signal beam 58 and downlink signals 62 of FIG. 5). Base station 11 may, for example, transmit the TPC command using the PDCCH of the 5G NR communications protocol. The TPC command may identify an output power level change $\Delta$P2 for device 10 to use in subsequent transmissions of uplink signals 60. Output power level change $\Delta$P2 may be a decrease in output power level or may be an increase of output power level (e.g., an increase of output power level in a gradual output power level ramp as shown in plots 80 and 82 of FIG. 7). Base station 11 may also allocate a new set of uplink resource blocks to device 10 for subsequent uplink transmissions (e.g., a number of resource blocks R1).

At step 134, device 10 may receive the TPC command from device 10 and the new resource block allocation.

At step 136, device 10 may transmit uplink signals (e.g., uplink signals of FIG. 5) using the uplink grant allocation received from base station 11 (e.g., using the R1 resource blocks allocated to device 10) and using an updated output power level (e.g., based on the output power level in the received TPC command). Device 10 may transmit these uplink signals using a second antenna scaling setting (e.g., using a second set or number N1 of antennas 30 in phased antenna array 36). The number N1 of antennas 30 may include all of the antennas 30 or any desired subset of the antennas 30 in phased antenna array 36. Device 10 may, for example, determine that the number N1 of antennas 30 should be used to optimize wireless performance and power consumption at any desired time prior to or concurrent with processing step 136 (e.g., based on gathered wireless performance metric and/or power consumption information). Use of N1 antennas 30 may introduce an output power discontinuity PE to the output power density of device 10 (e.g., an output power discontinuity such as the discontinuities associated with arrows 94 or 96 of FIG. 7). The output power level of device 10 in transmitting the uplink signals at step 136 may therefore be P0+$\Delta$P1+$\Delta$P2+PE. Device 10 may transmit the uplink signals using the PUSCH, PUCCH, or SRS of the 5G NR communications protocol, for example.

In order to inform base station 11 and network 52 of the change in antenna scaling setting, device 10 may also transmit an antenna scaling indication (sometimes referred to herein as antenna scaling information, an antenna scaling identifier, an antenna scaling indication message, or an antenna scaling message) to base station 11. The antenna scaling indication may inform base station 11 and network 52 that device 10 has changed the number of active antennas used in transmitting uplink signals. Device 10 may transmit the antenna scaling indication using the PUSCH, PUCCH, SRS, MAC CE, or RRC of the 5G NR communication protocol.

In one suitable arrangement, device 10 may transmit the antenna scaling indication by appending the antenna scaling indication to the uplink signals transmitted by device 10 using the PUSCH, PUCCH, or SRS of the 5G NR communication protocol. The antenna scaling indication may, for example, be a single bit. The single bit may be appended to the uplink signals transmitted by device 10 using the PUSCH, PUCCH, or SRS of the 5G NR communication protocol. The single bit may have two logical states (e.g., "1" and "0"). In the first logical state, the single bit may indicate that a change in antenna scaling setting (e.g., a change in the number of active transmit antennas) has occurred. In the second logical state, the single bit may indicate that no change in antenna scaling setting has occurred (e.g., the single bit may be appended to the uplink signals in the second logical state whenever there has been no change in the number of active antennas for transmission of uplink signals). Network 52 may, for example, be able to deduce whether more or fewer antennas are active after the antenna scaling operation based on the current TDC trend (e.g., based on whether power was being ramped up or down).

In another suitable arrangement, the antenna scaling indication may be two bits. The two bits may have four logical states (e.g., "00," "01," "10," and "11"). In addition to identifying whether or not a change in antenna scaling has occurred, the two bits may also identify whether there has been an increase or a decrease in the number of active antennas used in transmitting the uplink signals. In yet another suitable arrangement, the antenna scaling indication may be three or more bits. This may, for example, allow device 10 to inform base station 11 of whether or not there has been a change in the number of active antennas, whether there has been an increase or a decrease in the number of active antennas, and the size of the increase or decrease. These examples are merely illustrative and, in general, any desired antenna scaling indication may be used.

At step 138, base station 11 may receive the uplink signals and the antenna scaling indication transmitted by device 10 (e.g., as transmitted using the allocated R1 resource blocks, N1 antennas 30, and output power level P0+ΔP1+ΔP2+PE).

At step 140, base station 11 and/or network 52 may take suitable action based on the antenna scaling indication received from device 10. For example, base station 11 may track the behavior of device 10 at different antenna scaling settings (e.g., by gathering beam quality reports for each setting), may re-allocate network resources to device 10 based on the change in antenna scaling setting, and/or may perform any other desired operations to adapt the behavior and scheduling of base station 11 and network 52 to the change in antenna scaling setting. If desired, base station 11 and/or network 52 may allocate channel status information reference signal (CSI-RS) resources to device 10 to collect new beam quality reports from device 10 for the newly re-scaled antenna architecture. If desired, base station 11 and/or network 52 may allocate CSI-RS resources localized to the beam which device 10 has already selected based on antenna architecture prior to the change in antenna scaling setting.

In this way, base station 11 and network 52 may accommodate changes in antenna scaling setting at device 10 without incorrectly interpreting output power level discontinuities as variations in propagation condition, incorrectly determining that device 10 has failed the radio-frequency requirements, or making network decisions that are not well-aligned with the actual behavior of device 10, thereby optimizing network throughput and performance despite the change in antenna scaling setting at device 10. In other suitable arrangements, if desired, base station 11 may instruct device 10 to revert to its previous antenna scaling or to use a different antenna scaling in response to receiving the antenna scaling indication, may allow wireless performance metric information to converge before making further network decisions in response to receiving the antenna scaling indication (e.g., rather than determining that device 10 fails radio-frequency requirements immediately upon identifying an output power density discontinuity), may ignore output power level discontinuities in response to receiving the antenna scaling indication, or may perform any other desired actions in response to receiving the antenna scaling indication. In scenarios where device 10 transmits a PHAS report (e.g., at step 120), base station 11 and/or network 52 may prepare additional beam quality report states and CSI-RS resources to track additional antenna scaling settings (e.g., antenna architecture states) for device 10 (e.g., at any desired time subsequent to step 122), and/or may optimize the TPC algorithm convergence by informing the ΔP values in subsequent TPC commands with the information from the PHAS report received from device 10, as examples. The steps of FIG. 8 are merely illustrative and may, if desired, be performed in other orders. Two or more of the steps of FIG. 8 may be performed concurrently if desired.

Figure 9:
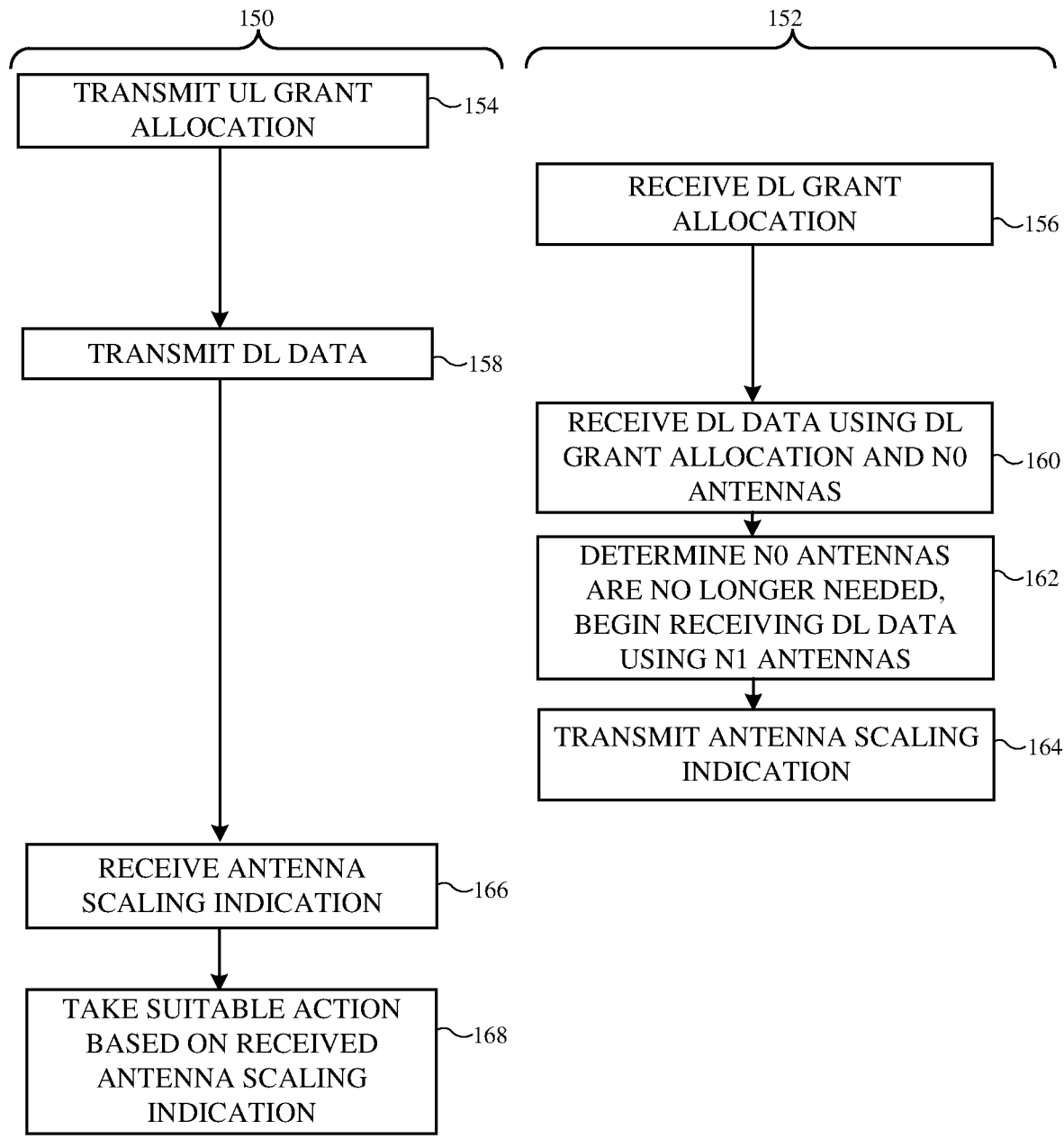
FIG. 9 is a flow chart of illustrative steps that may be performed by a wireless network having an electronic device that informs a wireless base station of a change in downlink antenna scaling settings in accordance with some embodiments.

FIG. 9 is a flow chart of steps that may be performed by wireless network 50 of FIG. 5 to accommodate receive (downlink) antenna scaling operations performed by device 10. Steps 150 of FIG. 9 (e.g., steps 154, 158, 166, and 168) may be performed by base station 11 and/or network 52. Steps 152 of FIG. 8 (e.g., steps 156, 160, 162, and 164) may be performed by device 10.

At step 154, base station 11 may transmit a downlink grant allocation to device 10 (e.g., using signal beam 58 and downlink signals 62 of FIG. 5). Base station 11 may, for example, transmit the downlink grant allocation using DCI in the PDCCH of the 5G NR communications protocol. The downlink grant allocation may include a downlink resource block (RB) allocation (e.g., a number of resource blocks R0).

At step 156, device 10 may receive the downlink grant allocation from base station 11 (e.g., using one or more antennas 30).

At step 158, base station 11 may transmit downlink data to device 10 (e.g., using signal beam 58 and downlink signals 62 of FIG. 5). Base station 11 may, for example, transmit the downlink data using the Physical Downlink Shared Channel (PDSCH) of the 5G NR communications protocol.

At step 160, device 10 may receive the downlink data from base station 11 (e.g., over the PDSCH). Device 10 may receive the downlink data using the downlink resource block allocation received at step 156 and using a first set of N0 antennas 30.

At step 162, device 10 may determine that the first set of N0 antennas 30 is no longer needed to continue reception with satisfactory beam/signal quality (e.g., that device 10 no longer needs to use the same number of active antennas for receiving the downlink signals at or above a predetermined target SNR threshold level). Device 10 may make this determination while processing step 70 of FIG. 6 (e.g., based on gathered wireless performance metric and/or power consumption information). Device 10 may then change antenna scaling settings to begin receiving the downlink signals using a second set of N1 antennas 30. The second set of N1 antennas 30 includes fewer antennas than the first set of N0 antennas 30 in this example. This is, however, merely illustrative and, if desired, N0 may be less than N1.

At step 164, device 10 may inform base station 11 and network 52 of the change in antenna scaling setting by transmitting an antenna scaling indication to base station 11. The antenna scaling indication may inform base station 11 and network 52 that device 10 has changed the number of active antennas used in receiving downlink signals. Device 10 may transmit the antenna scaling indication using the PUSCH, PUCCH, SRS, MAC CE, or RRC of the 5G NR communication protocol. In another suitable arrangement, device 10 may bundle the antenna scaling indication with hybrid automatic repeat request (HARQ) feedback transmitted to base station 11. The antenna scaling indication may be a single bit, two bits, or more than two bits (e.g., to inform base station 11 of whether or not antenna scaling has occurred, whether the number of active antennas has increased or decreased, and/or the extent to which the number of active antennas has increased or decreased). The bit(s) of the antenna scaling indication may be appended or bundled with other uplink data transmitted to base station 11 if desired.

At step 166, base station 11 may receive the antenna scaling indication transmitted by device 10.

At step 168, base station 11 and/or network 52 may take suitable action based on the antenna scaling indication received from device 10. For example, base station 11 may track the behavior of device 10 at different antenna scaling settings (e.g., by gathering beam quality reports for each setting), may re-allocate network resources to device 10 based on the change in antenna scaling indication, and/or may perform any other desired operations to adapt the behavior and scheduling of base station 11 and network 52 to the change in antenna scaling setting. If desired, base station 11 and/or network 52 may allocate CSI-RS resources to device to collect new beam quality reports from device 10 for the newly re-scaled antenna architecture. If desired, base station 11 and/or network 52 may allocate CSI-RS resources localized to the beam which device 10 has already selected based on antenna architecture prior to the change in antenna scaling setting.

In this way, base station 11 and network 52 may accommodate changes in antenna scaling setting at device 10 without incorrectly interpreting output power level discontinuities as variations in propagation condition, incorrectly determining that device 10 has failed the radio-frequency requirements, or making network decisions that are not well-aligned with the actual behavior of device 10, thereby optimizing network throughput and performance despite the change in antenna scaling setting at device 10. In other suitable arrangements, if desired, base station 11 may instruct device 10 to revert to its previous antenna scaling or to use a different antenna scaling in response to receiving the antenna scaling indication, may allow wireless performance metric information to converge before making further network decisions in response to receiving the antenna scaling indication (e.g., rather than determining that device 10 fails radio-frequency requirements immediately upon identifying an output power density discontinuity), may ignore output power level discontinuities in response to receiving the antenna scaling indication, or may perform any other desired actions in response to receiving the antenna scaling indication.

The steps of FIG. 9 may be performed independent of the steps of FIG. 8 if desired (e.g., device 10 may break beam correspondence and use different antenna scaling settings for transmitting uplink signals than for receiving downlink signals and may provide antenna scaling indications for changes in both the number of transmit antennas and the number of receive antennas to base station 11). The steps of FIG. 9 are merely illustrative and may, if desired, be performed in other orders. Two or more of the steps of FIG. 9 may be performed concurrently if desired. The antenna scaling setting (e.g., the set of active antennas and inactive antennas at any given time in phased antenna array 36) may sometimes also be referred to herein as a spatial filter for phased antenna array 36. Performing changes in the antenna scaling setting may sometimes be referred to herein as performing antenna scaling operations or changing the spatial filter for phased antenna array 36.

In the examples of FIGS. 8 and 9, device 10 determines when antenna scaling is needed and independently performs antenna scaling operations (e.g., without being instructed to do so by network 52). In another suitable arrangement, base station 11 and/or network 52 may control when or how device 10 performs antenna scaling operations. As two examples, base station 11 and/or network 52 may control antenna scaling operations performed by device 10 based on CSI-RS report invalidation messages or based on beam priority values transmitted by device 10.

Figure 10:
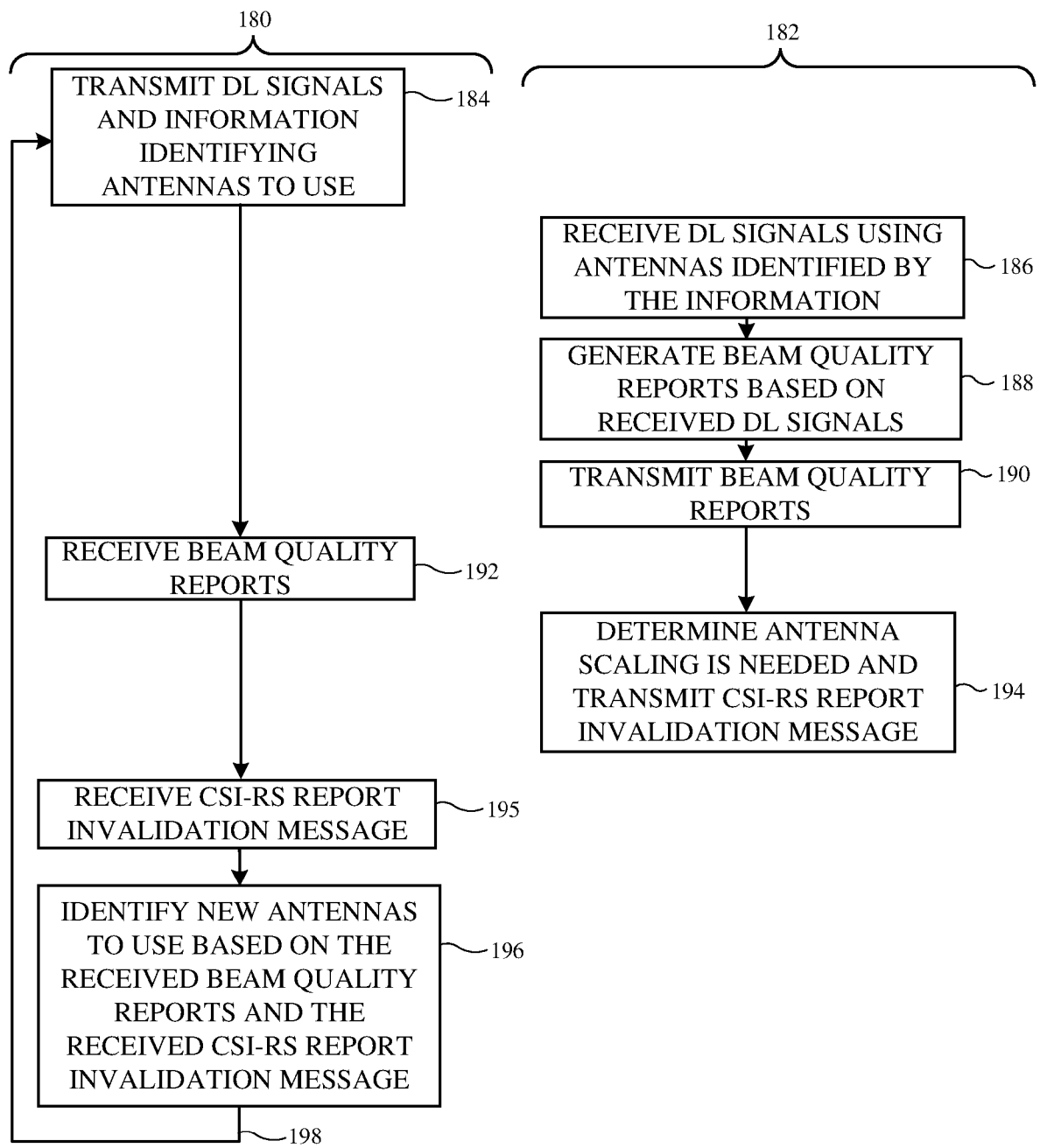
FIG. 10 is a flow chart of illustrative steps that may be performed by a wireless network in generating new downlink antenna scaling settings for an electronic device based on an invalidation message transmitted by the electronic device in accordance with some embodiments.

FIG. 10 is a flow chart of illustrative steps that may be performed by wireless network 50 of FIG. 5 in performing antenna scaling operations based on CSI-RS report invalidation messages transmitted by device 10. Steps 180 of FIG. 10 (e.g., steps 184, 192, 195, and 196) may be performed by base station 11 and/or network 52. Steps 182 of FIG. 10 (e.g., steps 186, 188, 190, and 194) may be performed by device 10.

At step 184, base station 11 may transmit downlink signals to device 10. The downlink signals may include information identifying active antennas 30 for device 10 to use in receiving downlink signals (e.g., a number N0 of antennas 30 to use for receiving downlink signals). The downlink signals may also include an instruction to perform one or more of the subsequently-performed steps of FIG. 10 detailed below.

At step 186, device 10 may receive the downlink signals transmitted by base station 11. Device 10 may then use the active antennas identified in the downlink signals (e.g., the number N0 of antennas 30) to receive subsequent downlink signals.

At step 188, device 10 may generate beam quality reports based on the received downlink signals (e.g., based on the signals received using the active number N0 of antennas 30). The beam quality reports may include any desired wireless performance metric information associated with different signal beams formable using the N0 active antennas 30.

At step 190, device 10 may transmit the beam quality reports to base station 11 (e.g., using the PUSCH, PUCCH, and/or SRS of the 5G NR communications protocol).

At step 192, base station 11 may receive the beam quality reports transmitted by device 10.

At step 194, device 10 may determine that a change in antenna scaling setting is needed. Device 10 may make such a determination based on wireless performance metric and/or power consumption information gathered while receiving the downlink signals (e.g., while processing step 70 of FIG. 6). Device 10 may then transmit a beam invalidation message such as a CSI-RS report invalidation message to base station 11 (e.g., using the PUSCH, PUCCH, and/or SRS of the 5G NR communications protocol). The CSI-RS report invalidation message may identify which of the beam quality reports are no longer valid for continuing to receive downlink data after a change in antenna scaling setting. For example, the CSI-RS report invalidation message may identify that signal beams 56 (FIG. 5) are no longer valid (e.g., when device 10 determines that the lower peak gain of signal beam 54 of FIG. 5 will still be able to meet SNR requirements).

At step 195, base station 11 may receive the CSI-RS report invalidation message from device 10.

At step 196, base station 11 and/or network 52 may identify a new set of antennas 30 on device 10 to use for downlink signal reception based on the received CSI-RS report invalidation message and the received beam quality reports (e.g., a number N1 of antennas 30 to use for receiving downlink signals). In the example where the CSI-RS report invalidation message identifies that signal beams 56 are no longer valid, base station 11 may identify the set of antennas that forms signal beam 54 (FIG. 5) as the new set of antennas 30, for example. Processing may then loop back to step 184, as shown by arrow 198, and base station 11 may instruct device 10 to begin receiving the downlink signals using the new set of antennas 30 (e.g., using the N1 antennas 30).

Base station 11 and/or network 52 may also perform any other desired operations to accommodate the change in antenna scaling setting for device 10. For example, base station 11 and/or network 52 may allocate additional CSI-RS or SRS resources to update beam quality reports for device 10 and/or may perform any other desired operations to adapt the behavior and scheduling of base station 11 and network 52 to the change in antenna scaling setting at device 10. In this way, base station 11 and network 52 may accommodate changes in antenna scaling setting at device 10 without incorrectly interpreting output power level discontinuities as variations in propagation condition, incorrectly determining that device 10 has failed the radio-frequency requirements, or making network decisions that are not well-aligned with the actual behavior of device 10, thereby optimizing network throughput and performance despite the change in antenna scaling setting at device 10. The steps of FIG. 10 are merely illustrative and may, if desired, be performed in other orders. Two or more of the steps of FIG. 10 may be performed concurrently if desired.

Figure 11:
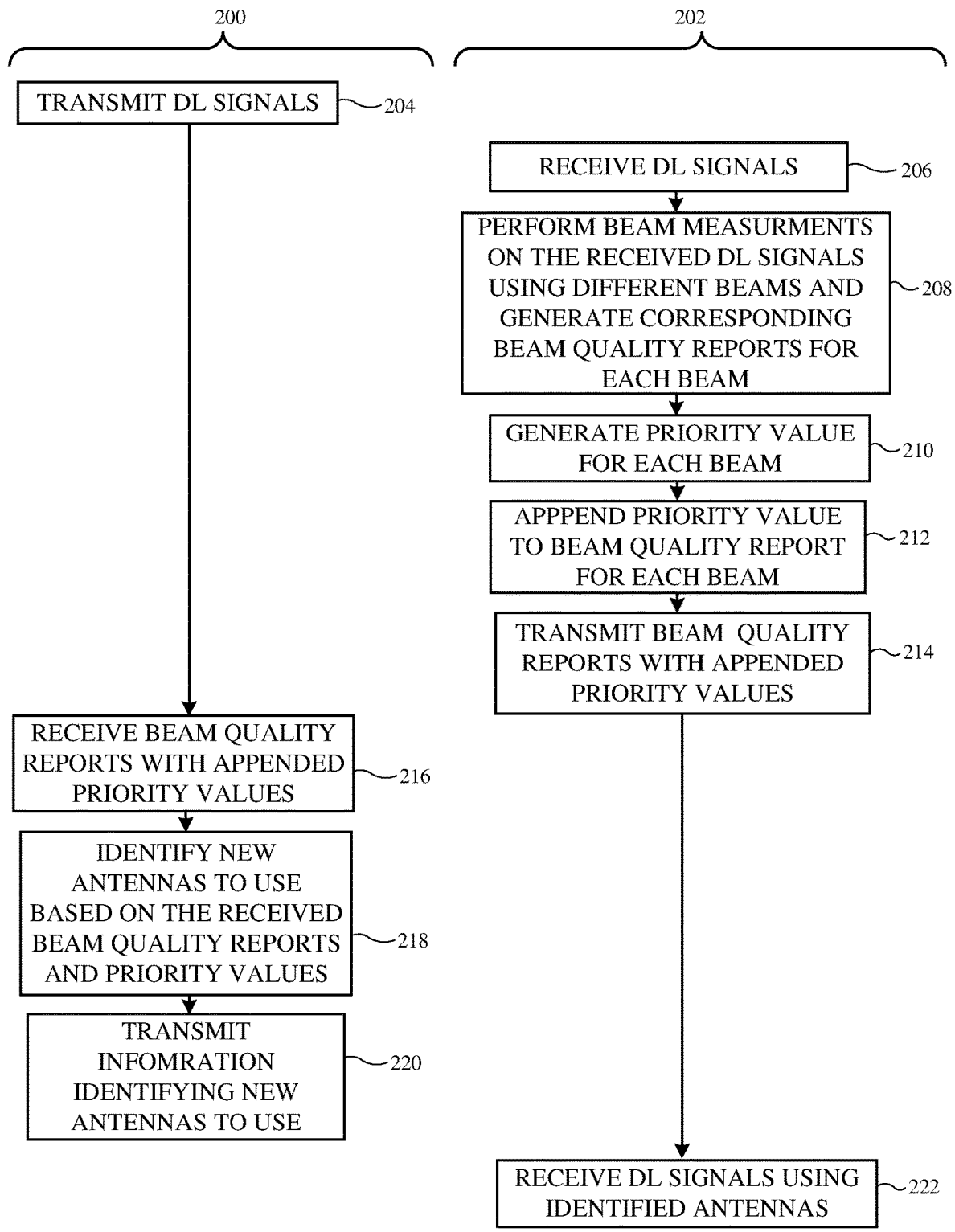
FIG. 11 is a flow chart of illustrative steps that may be performed by a wireless network in generating new downlink antenna scaling settings for an electronic device based on beam quality reports and priority values transmitted by the electronic device in accordance with some embodiments.

FIG. 11 is a flow chart of illustrative steps that may be performed by wireless network 50 of FIG. 5 in performing antenna scaling operations based on beam priority values transmitted by device 10. Steps 200 of FIG. 11 (e.g., steps 204, 216, 218, and 220) may be performed by base station 11 and/or network 52. Steps 202 of FIG. 11 (e.g., steps 206-214 and 222) may be performed by device 10.

At step 204, base station 11 may transmit downlink signals to device 10. The downlink signals may include an instruction to perform one or more of the subsequently-performed steps of FIG. 11 detailed below.

At step 206, device 10 may receive the downlink signals transmitted by base station 11. At step 208, device 10 may measure the received downlink signals using different receive signal beams and may generate corresponding beam quality reports for each of the receive signal beams (e.g., as defined in a CSI framework).

At step 210, device 10 may generate a power saving spatial filter priority value for each beam quality report (e.g., for each receive signal beam). Each priority value (sometimes referred to herein as a power savings priority value) may correspond to the level of power savings device 10 can derive by using the receive signal beam corresponding to that priority value. For example, device 10 may assign a first power savings priority value to receive signal beams that use all available antennas 30 in phased antenna array 36, may assign a second power savings priority value to receive signal beams that use half of the available antennas 30 in phased antenna array 36 (e.g., where the second power savings priority value corresponds to more power savings than the first power savings priority value), etc. The number of power saving priority values may be variable (e.g., configured by network 52 and provided to device 10 at, prior to, or subsequent to step 204), may be fixed (e.g., defined in the specification for the communications protocol), or may be configured based on the capabilities of device 10.

At step 212, device 10 may append the generated power savings priority values to corresponding ones of the generated beam quality reports.

At step 214, device 10 may transmit the beam quality reports with the appended power savings priority values to base station 11.

At step 216, base station 11 may receive the beam quality reports and power savings priority values transmitted by device 10.

At step 218, base station 11 and/or network 52 may identify a new set of antennas 30 on device 10 to use for downlink signal reception based on the beam quality reports and the power savings priority values received from device 10. As an example, base station 11 may receive a first beam quality report for a first receive signal beam and may receive a second beam quality report for a second receive signal beam from device 10. The first receive signal beam may have a first power savings priority value and the second receive signal beam may have a second power savings priority value that is higher priority (e.g., that corresponds to more power savings) than the first power savings priority value. Base station 11 and/or network 52 may select the second receive signal beam for subsequent use by device 10 (and thus a corresponding new set of antennas that is able to form the second receive signal beam) to optimize power consumption at device 10. The reverse procedure may apply as signal conditions degrade. For example, the network may make a decision to assign the first receive signal beam (and its corresponding active antennas) to device 10 once signal quality degrades beyond a certain threshold, which may be determined by the capabilities of device 10, configured by network 52, or captured in the specification for the communications protocol.

At step 220, base station 11 may transmit information identifying the receive signal beam(s) and corresponding new antennas for device 10 to use for subsequent downlink signal reception to device 10. Base station 11 may continue to transmit downlink signals to device 10 and device 10 may receive the downlink signals using the receive signal beam(s) and corresponding new antennas identified by base station 11 (step 222). Base station 11 and/or network 52 may also perform any other desired operations to accommodate the change in antenna scaling setting for device 10. For example, base station 11 and/or network 52 may allocate resources to update beam quality reports for device 10 and/or may perform any other desired operations to adapt the behavior and scheduling of base station 11 and network 52 to the change in antenna scaling setting at device 10. In this way, base station 11 and network 52 may accommodate changes in antenna scaling setting at device 10 without incorrectly interpreting output power level discontinuities as variations in propagation condition, incorrectly determining that device 10 has failed the radio-frequency requirements, or making network decisions that are not well-aligned with the actual behavior of device 10, thereby optimizing network throughput and performance despite the change in antenna scaling setting at device 10. The steps of FIG. 11 are merely illustrative and may, if desired, be performed in other orders. Two or more of the steps of FIG. 11 may be performed concurrently if desired.

Figure 12:
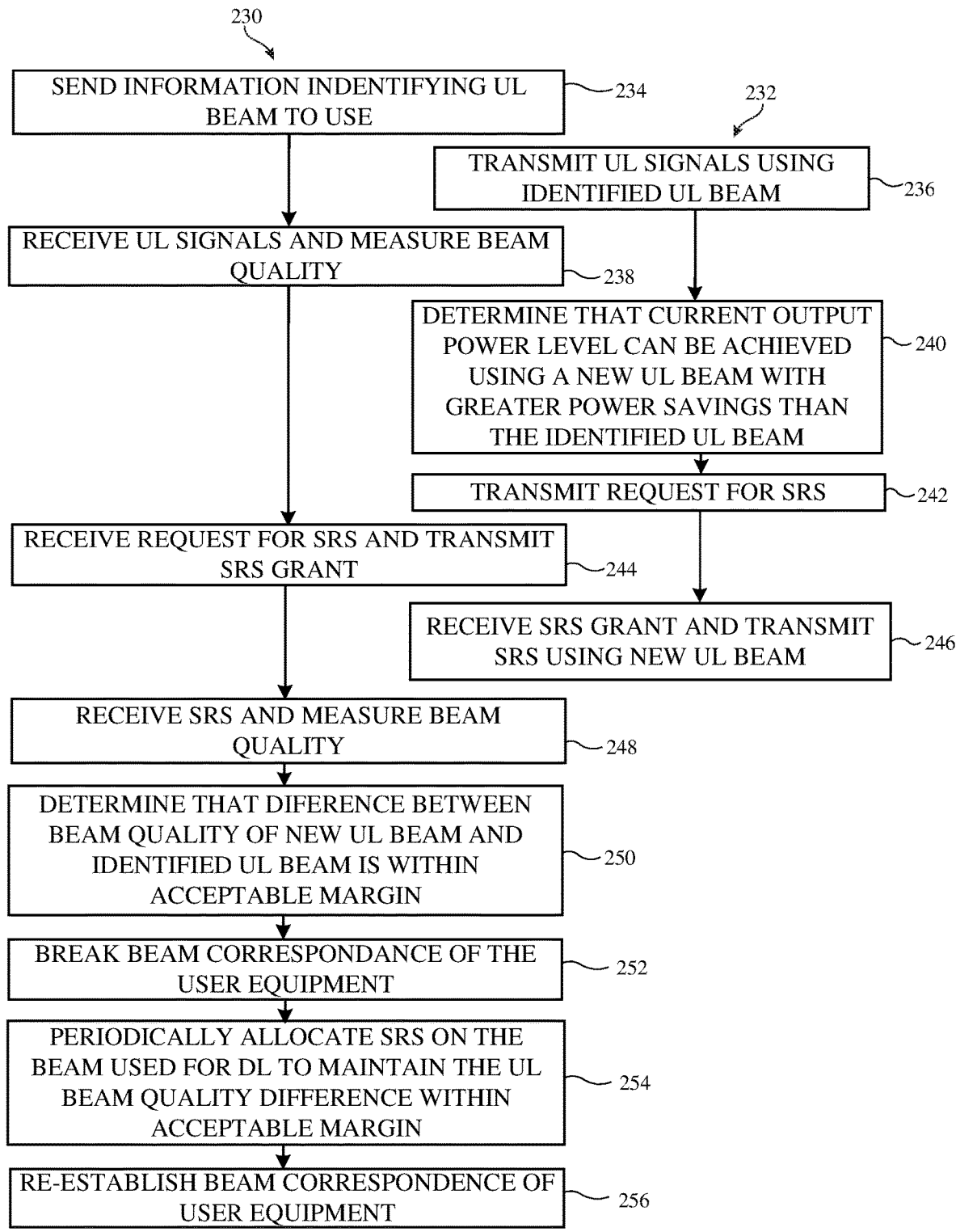
FIG. 12 is a flow chart of illustrative steps that may be performed by a wireless network in identifying new uplink antenna scaling settings for an electronic device based on a sounding reference signal (SRS) transmitted by the electronic device in accordance with some embodiments.

The examples of FIGS. 10 and 11 involve performing antenna scaling operations for receiving downlink signals at device 10. FIG. 12 is a flow chart of illustrative steps involved in using base station 11 and/or network 52 to control antenna scaling operations performed by device 10 in transmitting uplink signals to base station 11. Steps 230 of FIG. 12 (e.g., steps 234, 238, 244, and 248-256) may be performed by base station 11 and/or network 52. Steps 232 of FIG. 12 (e.g., steps 236, 240, 242, and 246) may be performed by device 10.

At step 234, base station 11 may send, to device 10, information identifying a signal beam for device 10 to use in transmitting uplink signals.

At step 236, device 10 may receive the information sent by base station 11 and may transmit uplink signals using the identified signal beam (e.g., using a set of antennas 30 that are able to form the identified signal beam).

At step 238, base station 11 may receive the uplink signals transmitted by device 10 and may measure the corresponding beam quality.

At step 240, device 10 may determine that the current output power level can be achieved using a new signal beam with greater power savings than the signal beam identified at step 234.

At step 242, device 10 may transmit a request for SRS to base station 11.

At step 244, base station 11 may receive the request for SRS from device 10. Base station 11 may generate a corresponding SRS grant and may transmit the SRS grant to device 10.

At step 246, device 10 may receive the SRS grant transmitted by base station 11.

Device 10 may then transmit a sounding reference signal (SRS) to base station 11 using the new signal beam with greater power savings (e.g., as determined at step 240) and the corresponding set of active antenna elements that are able to form the new transmit signal beam.

At step 248, base station 11 may receive the SRS transmitted by device 10 and may measure the corresponding beam quality.

At step 250, base station 11 and/or network 52 may determine whether the difference in uplink beam quality between the current signal beam from the perspective of the network (e.g., the signal beam identified at step 234 and as characterized by the beam quality measured at step 238) and the sounded signal beam (e.g., the signal beam used at step 246 and as characterized by the beam quality measured at step 248) is less than a predetermined threshold value (e.g., in dB). If the difference exceeds the threshold value, base station 11 may instruct device 10 to continue to use the signal beam identified at step 234 or may take other suitable actions. If the difference does not exceed the threshold value, processing may proceed to step 252.

At step 252, base station 11 and/or network 52 may break transmit and receive beam correspondence for device 10. For example, base station 11 and/or network 52 may maintain an existing quasi-colocation (QCL) mapping for PDSCH and/or PDCCH (e.g., device 10 may continue to use the signal beam identified at step 234 to receive downlink signals from base station 11) and may assign a different QCL mapping between PUSCH and/or PUCCH and SRS (e.g., so device 10 may use the new signal beam used at step 246 to transmit uplink signals).

At optional step 254, base station 11 and/or network 52 may periodically allocate SRS on the beam used for downlink to maintain the uplink beam quality difference within the predetermined threshold value.

At optional step 256, base station 11 and/or network 52 may re-establish transmit and receive beam correspondence for device 10. For example, base station 11 and/or network 52 may reconfigure the QCL mapping for PUCCH and/or PUSCH to downlink RS corresponding to PDSCH and/or PDCCH (e.g., device 10 may revert to using the beam identified at step 234 for transmitting subsequent uplink signals).

By default, assuming uplink/downlink beam correspondence, PUCCH is on the same signal beam as PDSCH. This means that device 10 needs to use the same number of antennas for PUCCH as PDSCH. However, signals conveyed using PUCCH are the type of signals that would benefit from reducing the number of antennas, since these signals are typically weaker than PUSCH, even if PUSCH is max power (e.g., typically PUCCH uses less bandwidth than PUSCH therefore, given equal power spectral density (PSD) for both, PUCCH results in lower transmitted power). It may be up to the implementation of device 10 to determine the threshold of a low bandwidth transmission that triggers this behavior. Further, this threshold can be signaled by device 10 as a capability, configured by network 52, or defined in the specification for the communications protocol.

If desired, device 10 may initiate an SRS request to send sounding signal on a transmit spatial filter (e.g., set of active antennas) with low bandwidth and improved power savings. In this scenario, device 10 may use an additional bit or a MAC CE header in the transmitted SRS request (e.g., at step 242) to indicate that the sounding request is for a low bandwidth transmission (e.g., PUCCH or a narrowband PUSCH transmission). Network 52 may maintain the existing QCL mapping for PDSCH and/or PDCCH (e.g., device 10 may continue to use the signal beam identified at step 234 to receive downlink signals) and may assign a different QCL mapping between PUCCH and/or narrowband PUSCH and SRS.

If desired, device 10 may also provide information about the optimal bandwidth to base station 11 along with the power savings priority value (e.g., while processing step 214 of FIG. 11). As one example, an additional bit may be appended to the transmission (e.g., at step 214 of FIG. 11) to indicate that a given power savings priority value is also applicable for low bandwidth transmission and/or reception. The threshold of a low bandwidth transmission or reception may be defined by a capability of device 10 or configured by the network. Low bandwidth uplink and low bandwidth downlink may also be separate values and capabilities.

In this way, base station 11 and network 52 may accommodate changes in antenna scaling setting at device 10 without incorrectly interpreting output power level discontinuities as variations in propagation condition, incorrectly determining that device 10 has failed the radio-frequency requirements, or making network decisions that are not well-aligned with the actual behavior of device 10, thereby optimizing network throughput and performance despite the change in antenna scaling setting at device 10. The steps of FIG. 12 are merely illustrative and may, if desired, be performed in other orders. Two or more of the steps of FIG. 12 may be performed concurrently if desired.

Device 10 (e.g., control circuitry 14 and wireless circuitry 24) and/or base station 11 may be configured to perform the operations of FIGS. 5-12 using hardware (e.g., dedicated hardware or circuitry), firmware, and/or software. Software code for performing the operations of FIGS. 5-12 may, for example, be stored on storage circuitry 20 (e.g., storage circuitry 20 may include non-transitory (tangible) computer readable storage media that stores the software code). The software code may sometimes be referred to as program instructions, software, data, instructions, or code. Software code stored on storage circuitry 20 may be executed by processing circuitry 22 (FIG. 3).

The foregoing is merely illustrative and various modifications can be made by those skilled in the art without departing from the scope and spirit of the described embodiments. The foregoing embodiments may be implemented individually or in any combination.

What is claimed is:

1. A method of operating an electronic device having a phased antenna array to communicate with a wireless base station, the method comprising:
   with a first set of antennas in the phased antenna array, transmitting uplink signals to the wireless base station at a first output power level;
   with the phased antenna array, receiving a transmit power control (TPC) command from the wireless base station; and
   with a second set of antennas in the phased antenna array, transmitting the uplink signals to the wireless base station at a second output power level based on the received TPC command, wherein the second set of antennas includes a different number of antennas than the first set of antennas, wherein the second output power level is different from the first output power level, and wherein the uplink signals transmitted by the second set of antennas include an antenna scaling indication that identifies that the electronic device has changed active antennas in the phased antenna array for transmission of the uplink signals.

2. The method of claim 1, wherein the uplink signals are transmitted by the electronic device within a Frequency Range 2 (FR2) frequency range of a 5G New Radio (NR) communications protocol.

3. The method of claim 1, further comprising:
   with a third set of antennas in the phased antenna array, receiving downlink signals from the wireless base station;
   subsequent to receiving the downlink signals using the third set of antennas, receiving the downlink signals from the wireless base station using a fourth set of antennas, wherein the fourth set of antennas includes a different number of antennas than the third set of antennas; and
   with the phased antenna array, transmitting an additional antenna scaling indication to the wireless base station, wherein the additional antenna scaling indication identifies that the electronic device has changed active antennas in the phased antenna array for reception of the downlink signals.

4. The method of claim 3, wherein the third set of antennas is different from the first and second sets of antennas.

5. The method of claim 3, further comprising:
   with the phased antenna array, transmitting hybrid automatic repeat request (HARQ) feedback to the wireless base station, wherein the additional antenna scaling indication comprises at least one bit, and wherein transmitting the additional antenna scaling indication comprises appending the at least one bit to the HARQ feedback transmitted to the wireless base station.

6. The method of claim 1, wherein the antenna scaling indication is a single bit having a first logical state that identifies that the electronic device has changed active antennas in the phased antenna array for transmission of the uplink signals and having a second logical state that identifies that the electronic device has not changed active antennas for transmission of the uplink signals.

7. The method of claim 1, wherein the antenna scaling indication is two bits and wherein the antenna scaling indication identifies whether the number of active antennas has increased or decreased for transmission of the uplink signals.

8. The method of claim 1, wherein the antenna scaling indication comprises at least three bits.

9. The method of claim 1, wherein the second set of antennas is configured to transmit the antenna scaling indication using a 5G New Radio (NR) communications protocol signal selected from the group consisting of: a physical uplink shared channel (PUSCH) signal, a physical uplink control channel (PUCCH) signal, a sounding reference signal (SRS), a media access control layer control element (MAC CE), and a radio resource control (RRC) message.

10. The method of claim 1, further comprising:
    with the first set of antennas in the phased antenna array, prior to reception of the TPC command, transmitting a power headroom until antenna scaling (PHAS) report to the wireless base station that identifies an amount of output power headroom that is present before the second set of antennas will be used to transmit the uplink signals.

11. The method of claim 1, wherein the electronic device comprises control circuitry, the method further comprising:
    with the control circuitry, gathering wireless performance metric data while the first set of antennas transmits the uplink signals;
    with the control circuitry, determining whether an antenna scaling operation should be performed based at least in part on the wireless performance metric data; and
    with the control circuitry, in response to determining that the antenna scaling operation should be performed, controlling the second set of antennas to transmit the uplink signals.

12. An electronic device configured to communicate with a wireless base station having antennas, the electronic device comprising:
    a phased antenna array; and
    control circuitry configured to
      receive, using a first set of antennas in the phased antenna array, first downlink signals within a Frequency Range 2 (FR2) frequency range of a 5G New Radio (NR) communications protocol from the wireless base station,
      transmit, using the phased antenna array, beam quality reports to the wireless base station, the beam quality reports being generated in response to reception of the first downlink signals by the first set of antennas in the phased antenna array, transmit, using the phased antenna array, uplink signals to the wireless base station that include information about receive signal beams formable by the phased antenna array, and receive, using the phased antenna array, second downlink signals from the wireless base station, wherein the second downlink signals instruct the electronic device to use a second set of antennas in the phased antenna array to form an optimal receive signal beam identified by the wireless base station based on the beam quality reports and the information about the receive signal beams transmitted by the phased antenna array, wherein the second set of antennas includes a different number of antennas than the first set of antennas.

13. The electronic device of claim 12, wherein the information about the receive signal beams comprises a channel status information reference signal (CSI-RS) report invalidation message associated with the receive signal beams.

14. The electronic device of claim 12, wherein the information about the receive signal beams comprises power savings priority values associated with the receive signal beams.

15. The electronic device of claim 14, wherein the power savings priority values are appended to the beam quality reports received from the electronic device.

16. A method of operating an electronic device having control circuitry and a phased antenna array to communicate with a wireless base station, the method comprising:

with a first set of antennas in the phased antenna array, transmitting uplink signals to the wireless base station at an output power level;

with the control circuitry, determining whether the output power level can be achieved using a second set of antennas with greater power savings for the electronic device than transmitting the uplink signals using the first set of antennas, wherein the second set of antennas includes a different number of antennas than the first set of antennas;

in response to determining that the output power level can be achieved using the second set of antennas with greater power savings for the electronic device than transmitting the uplink signals using the first set of antennas, transmitting a sounding reference signal (SRS) request to the wireless base station using the first set of antennas;

with the phased antenna array, receiving an SRS grant from the wireless base station; and with the control circuitry, in response to receiving the SRS grant, controlling the second set of antennas to transmit an SRS to the wireless base station.

17. The method of claim 16, wherein the uplink signals are transmitted by the electronic device within a Frequency Range 2 (FR2) frequency range of a 5G New Radio (NR) communications protocol.

18. The method of claim 17, further comprising:

with a third set of antennas in the phased antenna array that is different from the first and second sets of antennas, receiving downlink signals from the wireless base station within the FR2 frequency range.

19. The method of claim 17, further comprising:

with the control circuitry, appending an additional bit to the SRS request that indicates to the wireless base station that the SRS request is for a physical uplink control channel (PUCCH) transmission.

20. The method of claim 17, further comprising:

with the control circuitry, appending an additional bit to the SRS request that indicates to the wireless base station that the SRS request is for a narrowband physical uplink shared channel (PUSCH) transmission.

* * * * *